(12) United States Patent
Mancosh et al.

(10) Patent No.: US 11,572,646 B2
(45) Date of Patent: Feb. 7, 2023

(54) COMPOSITE BUILDING MATERIALS AND METHODS OF MANUFACTURE

(71) Applicant: Material Innovations LLC, Jupiter, FL (US)

(72) Inventors: Douglas G. Mancosh, Palm Beach Gardens, FL (US); Darrell J. Turner, Anderson, SC (US)

(73) Assignee: Material Innovations LLC, Jupiter, FL (US)

(*) Notice: Subject to any disclaimer, the term of this patent is extended or adjusted under 35 U.S.C. 154(b) by 1 day.

(21) Appl. No.: 17/216,858

(22) Filed: Mar. 30, 2021

(65) Prior Publication Data

US 2022/0154393 A1 May 19, 2022

Related U.S. Application Data

(60) Provisional application No. 63/115,318, filed on Nov. 18, 2020.

(51) Int. Cl.

| | |
|---|---|
| *D06N 7/00* | (2006.01) |
| *D04H 5/04* | (2006.01) |
| *B32B 5/02* | (2006.01) |
| *B32B 5/26* | (2006.01) |
| *B32B 29/00* | (2006.01) |
| *B29C 70/08* | (2006.01) |

(Continued)

(52) U.S. Cl.
CPC .............. *D04H 5/04* (2013.01); *B29C 70/081* (2013.01); *B32B 5/022* (2013.01); *B32B 5/26* (2013.01); *B32B 29/002* (2013.01); *D04H 1/58* (2013.01); *D04H 3/12* (2013.01)

(58) Field of Classification Search
CPC .......... D04H 5/04; D04H 1/58; B29C 70/081; B32B 5/022; B32B 5/26; B32B 29/002
USPC ......................................................... 442/412
See application file for complete search history.

(56) References Cited

U.S. PATENT DOCUMENTS

| | | | |
|---|---|---|---|
| 3,170,832 A | 2/1965 | Wilson et al. | |
| 3,471,355 A | 10/1969 | Truesdell et al. | |

(Continued)

FOREIGN PATENT DOCUMENTS

| | | |
|---|---|---|
| CA | 2028527 A1 | 3/1992 |
| CA | 2353036 A1 | 1/2002 |

(Continued)

OTHER PUBLICATIONS

"ExactTM Plastomers," published by Exxon Mobil, available at: http://www.exxonmobilchemical.com/Chem-English/brands/exact-plastomers.aspx?In=pr, 1 page.

(Continued)

*Primary Examiner* — Vincent Tatesure
(74) *Attorney, Agent, or Firm* — Goodwin Procter LLP

(57) ABSTRACT

An example composite building material includes one or more layers of polymeric fibers, binding agent, and optional fillers, and at least one surface layer of resin-impregnated paper disposed above and/or below the one or more layers. The one or more layers can include a core layer with longer polymeric fibers and top and bottom layers with shorter polymeric fibers. A method of manufacturing the composite building material includes forming the one or more layers, applying the at least one surface layer above and/or below the one or more layers, and heating and pressing the combined layers.

25 Claims, 12 Drawing Sheets

(51) Int. Cl.
  *D04H 1/58* (2012.01)
  *D04H 3/12* (2006.01)

(56) References Cited

U.S. PATENT DOCUMENTS

| | | | |
|---|---|---|---|
| 3,478,134 A | 11/1969 | Gruss et al. | |
| 3,511,750 A | 5/1970 | Hider | |
| 3,560,324 A | 2/1971 | Quackenbush | |
| 3,669,823 A * | 6/1972 | Name not available | D04H 5/06 |
| | | | 442/333 |
| 3,717,534 A | 2/1973 | Duling et al. | |
| 3,801,417 A | 4/1974 | Shanok et al. | |
| 3,804,693 A * | 4/1974 | Nichols, Jr. | B32B 29/005 |
| | | | 156/330 |
| 3,856,724 A | 12/1974 | O'Connor et al. | |
| 3,864,201 A | 2/1975 | Susuki et al. | |
| 3,936,554 A | 2/1976 | Squier | |
| 3,959,434 A | 5/1976 | Squier | |
| 3,970,324 A | 7/1976 | Howat | |
| 3,995,980 A | 12/1976 | Smith | |
| 4,025,686 A | 5/1977 | Zion | |
| 4,028,159 A | 6/1977 | Norris | |
| 4,029,839 A | 6/1977 | Lesti | |
| 4,044,188 A * | 8/1977 | Segal | B32B 27/34 |
| | | | 264/108 |
| 4,045,603 A | 8/1977 | Smith | |
| 4,154,893 A | 5/1979 | Goldman | |
| 4,158,646 A | 6/1979 | Benkowski et al. | |
| 4,212,703 A | 7/1980 | D'Amico et al. | |
| 4,212,928 A | 7/1980 | Arney, Jr. | |
| 4,315,048 A | 2/1982 | Beghelli et al. | |
| 4,382,108 A | 5/1983 | Carroll et al. | |
| 4,388,435 A | 6/1983 | Loch | |
| 4,405,752 A * | 9/1983 | Recker | C08K 7/02 |
| | | | 524/847 |
| 4,438,166 A | 3/1984 | Gluck et al. | |
| 4,459,334 A | 7/1984 | Blanpied et al. | |
| 4,463,043 A | 7/1984 | Reeves et al. | |
| 4,469,741 A | 9/1984 | Akao | |
| 4,480,061 A | 10/1984 | Coughlin et al. | |
| 4,503,115 A | 3/1985 | Hemels et al. | |
| 4,567,987 A | 2/1986 | Lepisto et al. | |
| 4,695,501 A | 9/1987 | Robinson | |
| 4,942,084 A | 7/1990 | Prince | |
| 5,002,624 A | 3/1991 | Howell et al. | |
| 5,045,389 A | 9/1991 | Campagna | |
| 5,130,352 A | 7/1992 | Chow | |
| 5,134,026 A | 7/1992 | Melcher | |
| 5,160,772 A | 11/1992 | Futami et al. | |
| 5,217,655 A | 6/1993 | Schmidt et al. | |
| 5,275,862 A | 1/1994 | Ramadan et al. | |
| 5,294,384 A | 3/1994 | David et al. | |
| 5,393,536 A | 2/1995 | Brandt et al. | |
| 5,441,801 A | 8/1995 | Deaner et al. | |
| 5,486,553 A | 1/1996 | Deaner et al. | |
| 5,496,648 A | 3/1996 | Held | |
| 5,498,667 A | 3/1996 | David et al. | |
| 5,516,472 A | 5/1996 | Laver | |
| 5,534,590 A | 7/1996 | Horiie et al. | |
| 5,535,945 A | 7/1996 | Sferrazza et al. | |
| 5,539,027 A | 7/1996 | Deaner et al. | |
| 5,578,370 A | 11/1996 | Ferrar et al. | |
| 5,591,802 A | 1/1997 | David et al. | |
| 5,601,912 A | 2/1997 | Ellingson | |
| 5,626,939 A | 5/1997 | Kotlair et al. | |
| 5,641,553 A | 6/1997 | Tingley | |
| 5,648,138 A | 7/1997 | Tingley | |
| 5,662,994 A | 9/1997 | Funger et al. | |
| 5,695,874 A | 12/1997 | Deaner et al. | |
| 5,722,603 A | 3/1998 | Costello et al. | |
| 5,725,939 A | 3/1998 | Nishibori et al. | |
| 5,728,741 A | 3/1998 | Zegler et al. | |
| 5,735,092 A | 4/1998 | Clayton et al. | |
| 5,738,935 A | 4/1998 | Turk et al. | |
| 5,773,138 A | 6/1998 | Seethamraju et al. | |
| 5,786,279 A | 7/1998 | Funger et al. | |
| 5,786,280 A | 7/1998 | Funger et al. | |
| 5,789,477 A | 8/1998 | Nosker et al. | |
| 5,792,529 A | 8/1998 | May | |
| 5,804,641 A | 9/1998 | Iwakawa | |
| 5,827,462 A | 10/1998 | Brandt et al. | |
| 5,827,607 A | 10/1998 | Deaner et al. | |
| 5,836,128 A | 11/1998 | Groh et al. | |
| 5,840,773 A | 11/1998 | Booij et al. | |
| 5,847,016 A | 12/1998 | Cope | |
| 5,858,522 A | 1/1999 | Turk et al. | |
| 5,866,264 A | 2/1999 | Zehner et al. | |
| 5,869,138 A | 2/1999 | Nishibori et al. | |
| 5,883,191 A | 3/1999 | Hughes | |
| 5,912,315 A | 6/1999 | Horiie et al. | |
| 5,919,575 A | 7/1999 | Bowns, IV et al. | |
| 5,932,334 A | 8/1999 | Deaner et al. | |
| 5,948,524 A | 9/1999 | Seethamraju et al. | |
| 5,951,927 A | 9/1999 | Cope | |
| 5,981,067 A | 11/1999 | Seethamraju et al. | |
| 6,004,668 A | 12/1999 | Deaner et al. | |
| 6,007,590 A | 12/1999 | Sanders, Jr. | |
| 6,011,091 A | 1/2000 | Zehner | |
| 6,015,611 A | 1/2000 | Deaner et al. | |
| 6,015,612 A | 1/2000 | Deaner et al. | |
| 6,015,856 A | 1/2000 | Matsushita et al. | |
| 6,017,830 A | 1/2000 | Brown et al. | |
| 6,054,207 A | 4/2000 | Finley | |
| 6,059,207 A | 5/2000 | Costello et al. | |
| 6,063,473 A | 5/2000 | Zafiroglu | |
| 6,066,367 A | 5/2000 | Nishibori et al. | |
| 6,066,680 A | 5/2000 | Cope | |
| 6,083,601 A | 7/2000 | Prince et al. | |
| 6,096,403 A | 8/2000 | Wycech | |
| 6,103,791 A | 8/2000 | Zehner | |
| 6,106,654 A | 8/2000 | Velin et al. | |
| 6,117,924 A | 9/2000 | Brandt | |
| 6,122,877 A | 9/2000 | Hendrickson et al. | |
| 6,132,840 A | 10/2000 | Lee et al. | |
| 6,133,349 A | 10/2000 | Hughes | |
| 6,180,211 B1 | 1/2001 | Held | |
| 6,194,051 B1 | 2/2001 | Gagas et al. | |
| 6,210,792 B1 | 4/2001 | Seethamraju et al. | |
| 6,211,275 B1 | 4/2001 | Xanthos et al. | |
| 6,217,967 B1 | 4/2001 | Bobrowicz | |
| 6,241,168 B1 | 6/2001 | Young et al. | |
| 6,248,813 B1 | 6/2001 | Zehner | |
| 6,265,037 B1 | 7/2001 | Godavarti et al. | |
| 6,271,270 B1 | 8/2001 | Muzzy et al. | |
| 6,274,637 B1 | 8/2001 | Schallenberg et al. | |
| 6,280,667 B1 | 8/2001 | Koenig et al. | |
| 6,305,920 B1 | 10/2001 | Kean et al. | |
| 6,306,318 B1 | 10/2001 | Ricciardelli et al. | |
| 6,316,016 B1 | 11/2001 | Iwakawa | |
| 6,342,172 B1 | 1/2002 | Finley | |
| 6,344,268 B1 | 2/2002 | Stucky et al. | |
| 6,344,504 B1 | 2/2002 | Zehner et al. | |
| 6,344,515 B1 | 2/2002 | Parikh et al. | |
| 6,352,784 B1 | 3/2002 | Katagiri | |
| 6,357,197 B1 | 3/2002 | Serino et al. | |
| 6,375,777 B1 | 4/2002 | Sjolin et al. | |
| 6,383,652 B1 | 5/2002 | Templeton et al. | |
| 6,387,967 B2 | 5/2002 | Muzzy et al. | |
| 6,465,046 B1 | 10/2002 | Hansson et al. | |
| 6,498,205 B1 | 12/2002 | Zehner | |
| 6,511,757 B1 | 1/2003 | Brandt et al. | |
| 6,517,935 B1 | 2/2003 | Kornfalt et al. | |
| 6,526,712 B2 | 3/2003 | Brooks et al. | |
| 6,534,592 B1 | 3/2003 | Chou et al. | |
| 6,558,754 B1 | 5/2003 | Velin et al. | |
| 6,565,919 B1 | 5/2003 | Hansson et al. | |
| 6,579,605 B2 | 6/2003 | Zehner | |
| 6,592,962 B2 | 7/2003 | Edwards et al. | |
| 6,605,245 B1 | 8/2003 | Dubelsten et al. | |
| 6,632,387 B2 | 10/2003 | Archuletta et al. | |
| 6,632,863 B2 | 10/2003 | Hutchison et al. | |
| 6,662,515 B2 | 12/2003 | Buhrts et al. | |
| 6,673,207 B1 | 1/2004 | Nishibori et al. | |

(56) References Cited

U.S. PATENT DOCUMENTS

| | | |
|---|---|---|
| 6,680,090 B2 | 1/2004 | Godavarti et al. |
| 6,682,789 B2 | 1/2004 | Godavarti et al. |
| 6,682,814 B2 | 1/2004 | Hendrickson et al. |
| 6,685,993 B1 | 2/2004 | Hansson |
| 6,692,815 B2 | 2/2004 | Edgman |
| 6,702,259 B2 | 3/2004 | Pratt |
| 6,723,424 B2 | 4/2004 | Ricciardelli et al. |
| 6,749,921 B1 | 6/2004 | Edwards et al. |
| 6,756,412 B2 | 6/2004 | Muzzy |
| 6,758,996 B2 | 7/2004 | Monovoukas et al. |
| 6,761,794 B2 | 7/2004 | Mott et al. |
| 6,784,230 B1 | 8/2004 | Patterson et al. |
| 6,786,988 B1 | 9/2004 | Bell |
| 6,814,826 B1 | 11/2004 | Bell |
| 6,821,613 B1 | 11/2004 | Kagi et al. |
| 6,821,614 B1 | 11/2004 | Dubelsten et al. |
| 6,841,101 B2 | 1/2005 | Nakos et al. |
| 6,844,049 B2 | 1/2005 | Amin-Javaheri |
| 6,860,953 B1 | 3/2005 | Grizzle et al. |
| 6,863,972 B2 | 3/2005 | Burger et al. |
| 6,865,849 B1 | 3/2005 | Mollinger et al. |
| 6,866,081 B1 | 3/2005 | Nordgard et al. |
| 6,867,322 B1 | 3/2005 | Kato et al. |
| 6,872,674 B2 | 3/2005 | Williams et al. |
| 6,939,496 B2 | 9/2005 | Maine et al. |
| 6,953,501 B2 | 10/2005 | Kelley et al. |
| 6,958,185 B1 | 10/2005 | Zehner |
| 6,971,211 B1 | 12/2005 | Zehner |
| 6,972,144 B2 | 12/2005 | Roth et al. |
| 6,984,676 B1 | 1/2006 | Brandt |
| 7,022,751 B2 | 4/2006 | Zhang et al. |
| 7,025,408 B2 | 4/2006 | Jones et al. |
| 7,030,179 B2 | 4/2006 | Patterson et al. |
| 7,037,459 B2 | 5/2006 | Easter |
| 7,045,590 B2 | 5/2006 | Bell |
| 7,169,464 B2 | 1/2007 | Semmens |
| 7,175,905 B2 | 2/2007 | Curtis et al. |
| 7,186,457 B1 | 3/2007 | Zehner et al. |
| 7,258,913 B2 | 8/2007 | Jo et al. |
| 7,279,058 B2 | 10/2007 | Morgan |
| 7,335,424 B2 | 2/2008 | Domine et al. |
| 7,348,067 B1 | 3/2008 | Hoffman |
| 7,405,008 B2 | 7/2008 | Domine et al. |
| 7,409,796 B2 | 8/2008 | Sacks |
| 7,410,687 B2 | 8/2008 | Dolinar |
| 7,414,084 B2 | 8/2008 | Yamaguchi et al. |
| 7,416,779 B2 | 8/2008 | Hashiba et al. |
| 7,473,722 B2 | 1/2009 | Guiselin et al. |
| 7,507,464 B2 | 3/2009 | Walrath |
| 7,754,120 B2 | 7/2010 | Kessing |
| 7,862,746 B2 | 1/2011 | Kaspers et al. |
| 7,875,655 B2 | 1/2011 | Mancosh et al. |
| 7,887,726 B1 | 2/2011 | Tsai |
| 7,913,960 B1 | 3/2011 | Herr, III et al. |
| 7,923,477 B2 | 4/2011 | Murdock et al. |
| 7,976,655 B2 | 7/2011 | Bacon et al. |
| 8,065,849 B2 | 11/2011 | Douglass |
| 8,075,987 B2 | 12/2011 | Ricciardelli et al. |
| 8,167,275 B1 | 5/2012 | Bizzarri et al. |
| 8,216,659 B2 | 7/2012 | Zafiroglu |
| 8,268,737 B1 | 9/2012 | Kumar |
| 8,278,365 B2 | 10/2012 | Murdock et al. |
| 8,439,161 B2 | 5/2013 | Bliton et al. |
| 8,455,558 B2 | 6/2013 | Mancosh et al. |
| 8,518,312 B2 | 8/2013 | Katz |
| 8,563,137 B2 | 10/2013 | Genz et al. |
| 8,809,406 B2 | 8/2014 | Murdock et al. |
| 8,957,120 B2 | 2/2015 | Berthevas et al. |
| 8,980,145 B2 | 3/2015 | Baroux |
| 9,028,731 B2 | 5/2015 | Weyant et al. |
| 9,056,444 B1 | 6/2015 | Moeller |
| 9,221,104 B2 | 12/2015 | Moore et al. |
| 9,254,624 B2 | 2/2016 | Calkins |
| 9,404,221 B2 | 8/2016 | Hagiopol et al. |
| 9,410,026 B1 | 8/2016 | Rees et al. |
| 9,447,547 B2 | 9/2016 | Penland, Jr. et al. |
| 9,637,920 B2 | 5/2017 | Murdock et al. |
| 9,695,601 B2 | 7/2017 | Whispell et al. |
| 10,227,470 B2 | 3/2019 | Li et al. |
| 11,060,290 B1 | 7/2021 | Rayman, Jr. et al. |
| 2001/0051243 A1 | 12/2001 | Godavarti et al. |
| 2001/0051249 A1 | 12/2001 | Gagas et al. |
| 2002/0007899 A1 | 1/2002 | Mott et al. |
| 2002/0009936 A1 | 1/2002 | North et al. |
| 2002/0014297 A1 | 2/2002 | Mott et al. |
| 2002/0025414 A1 | 2/2002 | Desai et al. |
| 2002/0031653 A1 | 3/2002 | Ricciardelli et al. |
| 2002/0031659 A1 | 3/2002 | Gansen et al. |
| 2002/0038924 A1 | 4/2002 | Nilsson et al. |
| 2002/0092256 A1 | 7/2002 | Hendrickson et al. |
| 2002/0096255 A1 | 7/2002 | Mott |
| 2002/0106498 A1 | 8/2002 | Deaner et al. |
| 2002/0153107 A1 | 10/2002 | Roffael |
| 2002/0192401 A1 | 12/2002 | Matsumoto et al. |
| 2002/0192431 A1 | 12/2002 | Edgman |
| 2003/0021915 A1 | 1/2003 | Rohatgi et al. |
| 2003/0075824 A1 | 4/2003 | Moore et al. |
| 2003/0087079 A1 | 5/2003 | Okabe et al. |
| 2003/0087572 A1 | 5/2003 | Balthes et al. |
| 2003/0087574 A1 | 5/2003 | Latimer et al. |
| 2003/0096094 A1 | 5/2003 | Hayduke |
| 2003/0104124 A1 | 6/2003 | Pavey et al. |
| 2003/0124940 A1 | 7/2003 | Michael |
| 2003/0125399 A1 | 7/2003 | Zhang et al. |
| 2003/0138616 A1 | 7/2003 | Englert |
| 2003/0154662 A1 | 8/2003 | Bruchu et al. |
| 2003/0198775 A1 | 10/2003 | Roth et al. |
| 2003/0207634 A1 | 11/2003 | Holeschovsky |
| 2003/0229160 A1 | 12/2003 | Williams et al. |
| 2004/0003888 A1 | 1/2004 | Mott et al. |
| 2004/0038002 A1 | 2/2004 | Franco et al. |
| 2004/0058163 A1 | 3/2004 | Gansen et al. |
| 2004/0062920 A1 | 4/2004 | Guilbert et al. |
| 2004/0076820 A1 | 4/2004 | Hodgson |
| 2004/0076846 A1 | 4/2004 | Domine et al. |
| 2004/0096628 A1 | 5/2004 | Saathoff et al. |
| 2004/0101674 A1 | 5/2004 | Ross |
| 2004/0126515 A1 | 7/2004 | Yarmoska |
| 2004/0126568 A1 | 7/2004 | Deaner et al. |
| 2004/0142160 A1 | 7/2004 | Cannon et al. |
| 2004/0161623 A1 | 8/2004 | Domine et al. |
| 2004/0161993 A1 | 8/2004 | Tripp et al. |
| 2004/0191617 A1 | 9/2004 | Visco et al. |
| 2004/0192794 A1 | 9/2004 | Patterson et al. |
| 2004/0224589 A1 | 11/2004 | Bacon et al. |
| 2004/0241392 A1 | 12/2004 | Sorrentino |
| 2004/0242108 A1 | 12/2004 | Russell et al. |
| 2004/0247845 A1 | 12/2004 | Abe et al. |
| 2004/0259973 A1 | 12/2004 | Sakuma et al. |
| 2005/0003221 A1 | 1/2005 | Walrath |
| 2005/0008814 A1 | 1/2005 | Bell |
| 2005/0019539 A1 | 1/2005 | Pike |
| 2005/0029709 A1 | 2/2005 | Jo et al. |
| 2005/0037176 A1 | 2/2005 | Domine |
| 2005/0042413 A1 | 2/2005 | Bell |
| 2005/0049329 A1 | 3/2005 | Faulkner |
| 2005/0058822 A1 | 3/2005 | Ittel |
| 2005/0115182 A1 | 6/2005 | Heiland |
| 2005/0132643 A1 | 6/2005 | Flanery et al. |
| 2005/0136272 A1 | 6/2005 | VanRheenen |
| 2005/0164580 A1 | 7/2005 | Holeschovsky |
| 2005/0170141 A1 | 8/2005 | Bacon et al. |
| 2005/0170157 A1 | 8/2005 | Armela et al. |
| 2005/0187315 A1 | 8/2005 | Dean |
| 2005/0206029 A1 | 9/2005 | Moore et al. |
| 2005/0233126 A1 | 10/2005 | Pike |
| 2005/0287347 A1 | 12/2005 | Sorrentino |
| 2006/0006564 A1 | 1/2006 | Maldas et al. |
| 2006/0032175 A1 | 2/2006 | Chen et al. |
| 2006/0099393 A1 | 5/2006 | Woodman et al. |
| 2006/0147669 A1 | 7/2006 | Mano et al. |
| 2006/0147687 A1 | 7/2006 | Ricciardelli et al. |
| 2006/0147693 A1* | 7/2006 | Przybylinski ......... B32B 27/304 428/292.1 |

(56) References Cited

U.S. PATENT DOCUMENTS

| | | |
|---|---|---|
| 2006/0165972 A1 | 7/2006 | Chimelak et al. |
| 2006/0183821 A1 | 8/2006 | Kaspers et al. |
| 2006/0188734 A1 | 8/2006 | Valentage et al. |
| 2006/0191655 A1 | 8/2006 | Nunn et al. |
| 2006/0229381 A1 | 10/2006 | Bartko |
| 2006/0234026 A1 | 10/2006 | Huusken |
| 2006/0257597 A1 | 11/2006 | Gleich |
| 2006/0267238 A1 | 11/2006 | Wang |
| 2007/0007682 A1 | 1/2007 | Maldas et al. |
| 2007/0009729 A1 | 1/2007 | Kessing |
| 2007/0009743 A1 | 1/2007 | Kessing et al. |
| 2007/0043128 A1 | 2/2007 | Jenkines et al. |
| 2007/0092701 A1 | 4/2007 | Jeng |
| 2007/0098972 A1 | 5/2007 | Balthes |
| 2007/0104930 A1 | 5/2007 | Grohman |
| 2007/0113759 A1 | 5/2007 | Roth et al. |
| 2007/0128428 A1 | 6/2007 | Moriya et al. |
| 2007/0141316 A1 | 6/2007 | McGrath et al. |
| 2007/0154669 A1 | 7/2007 | Schneider et al. |
| 2007/0154689 A1 | 7/2007 | Hughes et al. |
| 2007/0173551 A1 | 7/2007 | Mancosh et al. |
| 2007/0212531 A1 | 9/2007 | McIntyre et al. |
| 2007/0235705 A1 | 10/2007 | Burger et al. |
| 2007/0275207 A1 | 11/2007 | Higgins et al. |
| 2008/0010924 A1 | 1/2008 | Pietruczynik et al. |
| 2008/0064794 A1 | 3/2008 | Murdock et al. |
| 2008/0075915 A1 | 3/2008 | Wening et al. |
| 2008/0093763 A1 | 4/2008 | Mancosh et al. |
| 2008/0098935 A1 | 5/2008 | Roth et al. |
| 2008/0102263 A1 | 5/2008 | Slywchuk et al. |
| 2008/0128933 A1 | 6/2008 | Przybylinski et al. |
| 2008/0213562 A1 | 9/2008 | Przybylinski et al. |
| 2008/0233336 A1 | 9/2008 | Giannopoulos et al. |
| 2008/0263994 A1 | 10/2008 | Kain |
| 2008/0287576 A1 | 11/2008 | Nichols et al. |
| 2008/0289295 A1 | 11/2008 | Waters et al. |
| 2008/0293837 A1 | 11/2008 | Toft et al. |
| 2009/0053490 A1 | 2/2009 | Clausi et al. |
| 2009/0130355 A1 | 5/2009 | Chen et al. |
| 2009/0202803 A1 | 8/2009 | Poloso et al. |
| 2009/0288582 A1 | 11/2009 | Glessner et al. |
| 2010/0003431 A1 | 1/2010 | Raybuck |
| 2010/0021753 A1 | 1/2010 | Hojabr et al. |
| 2010/0058957 A1 | 3/2010 | Boxley |
| 2010/0159213 A1 | 6/2010 | Przybylinski et al. |
| 2010/0310893 A1 | 12/2010 | Derbyshire et al. |
| 2011/0020619 A1 | 1/2011 | Van Den Bossche et al. |
| 2011/0045250 A1 | 2/2011 | De Zen |
| 2011/0097552 A1 | 4/2011 | Mancosh et al. |
| 2011/0185662 A1 | 8/2011 | Mollinger et al. |
| 2012/0003462 A1 | 1/2012 | Wong |
| 2012/0031543 A1 | 2/2012 | Bacon et al. |
| 2012/0052760 A1 | 3/2012 | Doyle et al. |
| 2012/0077890 A1 | 3/2012 | Mancosh et al. |
| 2012/0315471 A1 | 12/2012 | Mancosh et al. |
| 2013/0046049 A1 | 2/2013 | Ono et al. |
| 2013/0280976 A1 | 10/2013 | McCann et al. |
| 2014/0212653 A1 | 7/2014 | Slywchuk et al. |
| 2014/0287145 A1 | 9/2014 | Brown et al. |
| 2015/0024171 A1 | 1/2015 | Murdock et al. |
| 2015/0044434 A1 | 2/2015 | Kotiadis et al. |
| 2015/0152650 A1 | 6/2015 | Cernohous et al. |
| 2015/0354143 A1 | 12/2015 | Pike |
| 2016/0032098 A1 | 2/2016 | Sherga |
| 2016/0082706 A1 | 3/2016 | Przybylinski et al. |
| 2016/0207283 A1 | 7/2016 | Wang et al. |
| 2018/0002934 A1 | 1/2018 | Pervan et al. |
| 2018/0094763 A1 | 4/2018 | Ragiel |
| 2018/0319942 A1 | 11/2018 | Kumar et al. |
| 2019/0066062 A1 | 2/2019 | Lilly et al. |
| 2019/0070680 A1 | 3/2019 | Lilly et al. |
| 2019/0161594 A1 | 5/2019 | Li et al. |
| 2019/0338517 A1 | 11/2019 | Murdock et al. |
| 2020/0061725 A1 | 2/2020 | Lilly |
| 2020/0338789 A1 | 10/2020 | Whitaker et al. |
| 2021/0238855 A1 | 8/2021 | Rayman, Jr. et al. |
| 2021/0390518 A1 | 12/2021 | Cochrane et al. |
| 2022/0064403 A1 | 3/2022 | Winterowd et al. |

FOREIGN PATENT DOCUMENTS

| | | |
|---|---|---|
| CA | 2594258 A1 | 7/2006 |
| CA | 2538539 A1 | 9/2006 |
| CA | 2607928 A1 | 4/2008 |
| CN | 1821295 A | 8/2006 |
| CN | 101015929 A | 8/2007 |
| CN | 201295961 Y | 8/2009 |
| CN | 101538356 A | 9/2009 |
| CN | 201420361 Y | 3/2010 |
| CN | 101830070 A | 9/2010 |
| CN | 102555003 A | 7/2012 |
| CN | 207432396 U | 6/2018 |
| CN | 109397807 A | 3/2019 |
| DE | 24 44 420 | 3/1976 |
| DE | 2722774 A1 | 11/1978 |
| DE | 43 38 199 | 2/1995 |
| DE | 19734338 A1 | 1/1999 |
| DE | 102008046481 A1 | 3/2010 |
| EP | 114409 A1 | 8/1984 |
| EP | 0473379 A2 | 3/1992 |
| EP | 548696 A1 | 6/1993 |
| EP | 0 0688 644 | 12/1995 |
| EP | 950510 A1 | 10/1999 |
| EP | 1016558 A2 | 7/2000 |
| EP | 1022400 A1 | 7/2000 |
| EP | 2952344 A1 | 12/2015 |
| FR | 3001914 A1 | 8/2014 |
| GB | 2071007 A | 9/1981 |
| JP | 51 062883 A | 5/1976 |
| JP | 02150303 A | 6/1990 |
| JP | 6155432 A | 6/1994 |
| JP | H105096 A | 1/1998 |
| JP | 2000263624 A | 9/2000 |
| JP | 2001072817 A | 3/2001 |
| JP | 2002241514 A | 8/2002 |
| JP | 2003003018 A | 1/2003 |
| JP | 2005 312782 A | 11/2005 |
| JP | 2013537492 A | 10/2013 |
| JP | 2016068300 A | 5/2016 |
| KR | 20070111293 A | 11/2007 |
| SE | 504501 C2 | 2/1997 |
| WO | WO-96/12857 A1 | 5/1996 |
| WO | WO-97/35700 A1 | 10/1997 |
| WO | WO-98/025983 A2 | 6/1998 |
| WO | WO-99/07786 A1 | 2/1999 |
| WO | WO-99/16984 A1 | 4/1999 |
| WO | WO-99/035364 A1 | 7/1999 |
| WO | WO-00/24577 A1 | 5/2000 |
| WO | WO-00/36218 A1 | 6/2000 |
| WO | WO-00/36242 A1 | 6/2000 |
| WO | WO-00/49246 A1 | 8/2000 |
| WO | WO-00/073037 A1 | 12/2000 |
| WO | WO-2001/028760 A1 | 4/2001 |
| WO | WO-01/47717 A1 | 7/2001 |
| WO | WO-01/47718 A1 | 7/2001 |
| WO | WO-01/48333 A1 | 7/2001 |
| WO | WO-01/058663 A1 | 8/2001 |
| WO | WO-01/78981 A1 | 10/2001 |
| WO | WO-2001/076869 A1 | 10/2001 |
| WO | WO-02/04206 A1 | 1/2002 |
| WO | WO-02/04207 A1 | 1/2002 |
| WO | WO-02/04208 A1 | 1/2002 |
| WO | WO-02/47906 A1 | 6/2002 |
| WO | WO-02/057692 A2 | 7/2002 |
| WO | WO-02/072367 A2 | 9/2002 |
| WO | WO-02/090129 A1 | 11/2002 |
| WO | WO-03/002338 A1 | 1/2003 |
| WO | WO-03/047858 A1 | 6/2003 |
| WO | WO-03/061967 A1 | 7/2003 |
| WO | WO-03/064520 A2 | 8/2003 |
| WO | WO-03/080337 A1 | 10/2003 |
| WO | WO-03/095537 A1 | 11/2003 |
| WO | WO-04/041534 A1 | 5/2004 |
| WO | WO-04/083541 A2 | 9/2004 |

(56) References Cited

FOREIGN PATENT DOCUMENTS

| | | |
|---|---|---|
| WO | WO-05/007384 A1 | 1/2005 |
| WO | WO-05/021656 A1 | 3/2005 |
| WO | WO-05/039843 A1 | 5/2005 |
| WO | WO-05/063479 A1 | 7/2005 |
| WO | WO-05/080496 A1 | 9/2005 |
| WO | WO-05/123380 A1 | 12/2005 |
| WO | WO-2006/001717 A1 | 1/2006 |
| WO | WO-2006/037538 A1 | 4/2006 |
| WO | WO-06/074276 A2 | 7/2006 |
| WO | WO-07/056629 A2 | 5/2007 |
| WO | WO-07/084822 A2 | 7/2007 |
| WO | WO-08/066751 A1 | 6/2008 |
| WO | WO-09/153324 A1 | 12/2009 |
| WO | WO-2010/056250 A1 | 5/2010 |
| WO | WO-2010/144969 A1 | 12/2010 |
| WO | WO-2011/007184 A2 | 1/2011 |
| WO | WO-2011/098470 A2 | 8/2011 |
| WO | WO-2012/007703 A1 | 1/2012 |
| WO | WO-2012/031131 A1 | 3/2012 |
| WO | WO-12/103378 A2 | 8/2012 |
| WO | WO-2012/168563 A2 | 12/2012 |
| WO | WO-2014/108465 A1 | 7/2014 |
| WO | WO-2014/137972 A1 | 9/2014 |
| WO | WO-2014/144193 A1 | 9/2014 |
| WO | WO-2015/196134 A1 | 12/2015 |
| WO | WO-2017/082914 A1 | 5/2017 |
| WO | WO-2019/094411 A2 | 5/2019 |
| WO | WO-2020/028914 A1 | 2/2020 |

OTHER PUBLICATIONS

"Fact Sheet: ENGAGE™ Polyolefin Elastomers—A product of Dow's Specialty Plastics and Elastomers business, ENGAGE™ is bridging the gap between rubber and plastic, and inspiring new design possibilities," published by The Dow Chemical Company, available at: http://www.dow.com/elastomers/products/engage.htm., 2 pages.

"Geon Duracap Vinyl Capstock," downloaded on Jun. 13, 2012 from http://www.polyone.com/en-us/products/vinylextrusionmold/Pages/DuracapVinylCapstockCompounds.aspx, 2 pages.

"New Wood Plastic Composite Products Strengthen Certain Teed's Position as one-stop-shop for Railing and Decking," downloaded on Jun. 13, 2012 from http://www.certainteed.com/pressroom/pressRelease.aspx?id=301 #, 2 pages.

"Polyolefin Elastomers," published by the International Institute of Synthetic Rubber Producers, available at: www.iisrp.com/WebPolymers/05ModPolyolefinElast_v1-2.pdf?, 3 pages.

"Reclaim and Resin Prices Skyrocket," Sep. 2004, http://www.principiaconsulting.com/publishing/pdf/WPCNewsSept04.pdf, 8 pages.

"The Fast Growing Wood Plastic Composites WPG," downloaded on Jun. 13, 2012 from, http://www.steerworld.com/down loads/KnowledgeCenter/Review%20Articles/THE%20FAST%20GROWING%20WPC.pdf, 5 pages.

"Wood-Filled Composites Jump off the Deck," downloaded on Jun. 13, 2012 from http://www.compositesworld.com/articles/wood-filled-composites-jump-off-the-deck, 6 pages.

"Wood-Plastic Composites need protection, too," downloaded on Jun. 13, 2012 from http://www.freepatentsonline.com/article/Plastics-Engineering/166824015.html, 4 pages.

280P Technical Data Sheet, Medium Density Overlay (MDO), available at https://paneltechintl.com > 20-280-P_TPS, downloaded on Apr. 19, 2021.

Anonymous: "Separation Process," Research Disclosure, Mason Publications, Hampshire, GB, vol. 388, No. 13, Aug. 1, 1996, ISSN: 0374-4353, 1 page.

Douglas J. Gardener, Adhesion Between Wood & Fiber Reinforced Polymers: Bonding Issues, Power Point Presentation, Advance Engineered Wood Composites Center.

European Office Action for 07862186.9 dated May 4, 2010 (7 pages).

Everboard High-Performance Roof Board, available at: <https://www.continuusmaterials.com/wp-content/uploads/2020/05/EverboardInformationSheet.pdf>, downloaded on Apr. 19, 2021.

International Search Report & Written Opinion for PCT/US2009/32552, dated Sep. 15, 2009 (22 pages).

International Search Report and Written Opinion for PCT/US2009/068964 dated Aug. 10, 2010 (14 pages).

International Search Report and Written Opinion for PCT/US2011/046798 dated Feb. 3, 2012 (13 pages).

International Search Report and Written Opinion for PCT/US2012/042248, dated Feb. 19, 2013 (27 pages).

International Search Report for International application PCT/US2007/024313, mailed from the International Search Authority dated Apr. 15, 2008, 13 pgs.

International Search Report for PCT/US07/60381 dated Oct. 1, 2007, 8 pp.

Jan H. Schut, Foaming Expands Possibilities for Wood-Fiber Composites, Plastics Technology, www.ptonline.com, Oct. 17, 2008.

Jan H. Schut, Wood is Good for Compounding, Sheet & Profile, Plastics Technology, www.ptonline.com, Oct. 17, 2008.

Jennifer Markarian, Wood Plastic Composites Need Protection, Too, Plastics Engineering, www.4spe.org., Jul. 2007.

K. Oksman, Improved interaction between wood and synthetic polymers in wood/polymer composites, Department of Wood Technology, Lulea University, Skelleftea, Sweden, Wood Science an Technology, vol. 30, Issue 3, Jun. 1996, pp. 197-205.

Kelly Williams, New Technology for Protecting Wood/Polymer Composites, Power Point Presentation, INFIN Coating Technology.

Krzysik et al., Wood-Polymer Bonding in Extruded and Non-Woven Web Composite Panels, Wood Adhesives 1990: Proceedings of a Symposium, Madison, WI, Forest Products Research Soicety, p. 183-189, 1991.

Maged Botros, Ph.D., Development of New Generation Coupling Agents for Wood-Plastic Composites, Equistar, Intertech Conference Dec. 3-5, 2003.

Mao et al., "Recycling Polyurethane Materials: A Comparison of Polyol from Glycolysis with Micronized Polyurethane Powder in Particleboard Applications," College of Forestry, Shandong Agriculture, University, Taian, China, 2014.

Nicole M. Stark and Laurent M. Matuana, Coating WPCS using Co-Extrusion to improve Durability, Coating Wood & Wood Composites: Designing for Durability, Federation of Societies for Coatings Technology, Jul. 23-25, 2007.

Nimz et al., "Wood," Ullmann's Encyclopedia of Industrial Chemistry, 2000, 454-505.

Partial International Search for PCT/US2012/042248 dated Oct. 8, 2012, 3 pages.

Partial International Search Report for PCT/US09/032552 dated Jun. 6, 2009, 2 pgs.

Preliminary Report with Written Opinonfor International application PCT/US2011/046798, mailed from the International Search Authority dated Feb. 21, 2013, 9 pgs.

Qiao et al., "Effect of particle size and volume fraction on tensile properties of fly ash/polyurea composites," Proceeding of SPIE, XP055090624, vol. 7644, Mar. 19, 2010, pp. 76441X-76441X-4.

San Diego Plastics, "Celuka Procedure," website: www.sdplastics.com/celukaprocess.html, undated, accessed Dec. 11, 2008, 1 pg.

Scott Gibson, Wood Substitutes Cost More but Promise Less Maintenance, Professional Deck Builder Online/Hanldy Wood, www.deckmagazine.com, Oct. 17, 2008.

Sotayo et al., "Carpet recycling: A review of recycled carpets for structural composites," Engineering Department, Lancaster University, Lancaster, UK, Mar. 9, 2015.

Techwoodn decking, Technical sheet, downloaded on Sep. 17, 2013 from http://www.google.com/url?sa=t&rct=j&q=&esrc=s&frm=1&source=web&cd=1&cad=rja&ved=0CCkQFJAA&url=http%3A%2F%2Fwww.techwoodn.com%2Fdata%2Fshwh%2F110222%2F110222010854tajktw.pdf&ei=wnw4UsKyLJWj4APC2oDQAw&usg=AFQjCNFIXJ5CdkRTOyPz-I2A3D8cTEeTyQ, 6 pages.

Tieq Li and Ning Yan, Ionomer as a multi-functional ingredient for value-added wood-plastic composites, Faculty of Forestry, University of Toronto.

(56) References Cited

OTHER PUBLICATIONS

Tieqi Li and Ning Yan, Mechanical properties of wood flour/HDPE/Ionomer composites, Faculty of Forestry, University of Toronto, Toronto Ontario Canada, Composites Part A: Applied Science and Manufacturing, vol. 38, Issue 1, Jan. 2007, pp. 1-12.

Wisegeek, "What are Foam Extrusions?," website: www.wisegeek.com/what-are-foam-extrusions.htm, 2003-2008, accessed Dec. 11, 2008, 2 pges.

U.S. Appl. No. 17/060,685, filed Oct. 1, 2020, Carpet Waste Composite, Murdock.

International Search Report and Written Opinion for International Patent Application No. PCT/US2021/059863, dated Mar. 11, 2022 (13 pages).

* cited by examiner

COMPOSITE BUILDING MATERIALS AND METHODS OF MANUFACTURE

CROSS-REFERENCE TO RELATED APPLICATIONS

This application claims the benefit of U.S. Provisional Patent Application No. 63/115,318, filed Nov. 18, 2020, the entire contents of which are incorporated by reference herein.

FIELD OF THE INVENTION

This invention relates to systems and methods for fabricating plastic composites (PCs) and, more particularly, to systems and methods for plastic composites that employ recycled carpet waste as a component of the composite.

BACKGROUND

Natural and manmade composites can be used in building construction, industrial applications, consumer goods, automotive products, and other industries requiring moisture or thermal resistance with various physical properties, such as low moisture absorbance and low thermal distortion. The ability to build composites of this nature, while controlling physical properties such as strength, stiffness, ductility, impact resistance, and hardness, opens a variety of application opportunities. PCs, however, may be expensive to produce, due in part to the high cost of virgin thermoplastic materials used therein. While use of PCs may be desirable as an alternative to natural wood products to limit the depletion of timber resources, the high cost of PCs compared to wood products may limit their use. Moreover, manufacturing PCs requires the manufacturing of even more virgin plastics, thus presenting an additional environmental problem.

There exists growing pressure to re-utilize waste streams which are high in volume and low in degradability. In particular the manufacture, installation, use and (eventually) replacement of floor covering products, especially carpeting, produces a large amount of waste product. Carpet waste from new carpet production, post-consumer landfill or other used carpet applications, is a several billion pound-per-year waste problem. Often, carpet waste is not recycled, but rather is disposed of by land-filling or burning, with the obvious attendant environmental and cost concerns.

What is needed, then, is a plastic composite that may still function acceptably in a variety of applications, while being inexpensive to manufacture, due to incorporation of readily available waste products.

SUMMARY

In general, the subject matter of this disclosure relates to composite building materials having (i) one or more layers of polymeric fibers and/or polymeric filler mixed with a binding agent and (ii) top and/or bottom layers (e.g., on outer surfaces) of a resin-impregnated paper (e.g., phenolic paper). The one or more layers of polymeric fibers and/or polymeric fillers and binding agent can include a core layer having long polymeric fibers (e.g., greater than 25 mm in length, on average) and top and bottom layers having shorter polymeric fibers (e.g., less than 25 mm in length, on average) disposed above and below the core layer, respectively. The polymeric fibers can be derived from carpet, automotive headliners, automotive sidewalls, fabric materials, insulation materials, other sources, or any combination thereof. The polymeric fillers can be or include, for example, biaxially oriented polypropylene, polymeric films, packaging films, barrier packaging films, recycled polymeric materials, or any combination thereof. The one or more layers of polymeric fibers and/or polymeric fillers and binding agent can include various additives and/or other fillers, such as, for example, natural fiber fillers, inorganic fillers, fiberglass, fire retardants, mold inhibitors, and/or other performance enhancing chemical additives.

Advantageously, use of the top and/or bottom layers of resin-impregnated paper can significantly improve various performance characteristics of the composite building materials including, for example, greater stiffness, greater resistance to mechanical damage, less moisture absorption, and greater resistance to dimensional changes caused by moisture or temperature variations. In one experiment, for example, the use of top and/or bottom layers of resin-impregnated paper was found to reduce the coefficient of thermal expansion (CTE) by as much as a factor of ten (e.g., CTE was reduced from 6.00E-05 to 6.00E-06). In another experiment, the use of top and/or bottom layers of resin-impregnated paper was found to reduce linear expansion caused by moisture absorption by a factor of about eight (e.g., linear expansion of a 6.1 meter board submerged in water for 144 hours was reduced from 2.5 cm to 0.33 cm). Additionally or alternatively, use of the top and/or bottom layers of resin-impregnated paper can provide a smoother exterior surface, which can improve an overall appearance of the final product and/or can achieve a more consistent or improved adhesion with surface coatings, such as paints or clear coats. Use of the top and/or bottom layers of resin-impregnated paper can also make manufacturing processes more consistent and/or reliable, for example, by reducing the adhesion of carpet or binding agent materials to press components during heating and pressure cycles, as described herein.

Additionally or alternatively, use of multiple layers of polymeric fibers and binding agent can have various performance benefits. For example, using a core layer with long fibers can improve mechanical properties, such as stiffness and dimensional stability. The long fibers, however, can result in a core layer that is nonuniform or irregular in thickness (e.g., with large peaks and valleys). Advantageously, the top and bottom layers of shorter fibers can cover thickness irregularities in the core layer to achieve a combined thickness of the core layer, the top layer, and the bottom layer that is substantially uniform (e.g., with small or no peaks and valleys). This can facilitate the formation of composite materials that are uniform in thickness and/or have smooth external surfaces. Additionally or alternatively, the multiple layers of polymeric fibers and binding agent can allow fillers and/or additives to be included or concentrated in individual layers where the fillers and/or additives will have the greatest performance benefits.

In general, in one aspect, the subject matter of this disclosure relates to a composite building material. The composite building material includes: a core layer including a first type of polymeric fibers and a first binding agent, the first type of polymeric fibers having a first average fiber length; a top layer disposed above the core layer and including a second type of polymeric fibers and a second binding agent, the second type of polymeric fibers having a second average fiber length different than the first average fiber length; a bottom layer disposed below the core layer and including the second type of polymeric fibers and the second binding agent; and at least one surface layer of resin-impregnated paper disposed above the top layer or below the bottom layer.

In certain examples, the first type of polymeric fibers and/or the second type of polymeric fibers can be derived from carpet, automotive headliners, automotive sidewalls, automotive fabrics, insulation materials, or any combination thereof. The second average fiber length can be less than the first average fiber length. The first average fiber length can be greater than about 25 mm. The core layer can have a substantially nonuniform thickness, and/or the core layer, the top layer, and the bottom layer together can have a substantially uniform thickness. The substantially nonuniform thickness can include an irregular thickness with peaks and valleys. The substantially nonuniform thickness can include a minimum thickness and a maximum thickness, and the minimum thickness can be less than half of the maximum thickness. The substantially uniform thickness can include a minimum thickness and a maximum thickness, and the minimum thickness can be at least 90% of the maximum thickness. In certain implementations, the first type of polymeric fibers and the second type of polymeric fibers can include fibers having the same or similar chemical composition and/or fiber diameters.

In some implementations, the first binding agent and/or the second binding agent can include methylenediphenyldiisocyanate (MDI), polyurea, polyurethane (e.g., a foamed polyurethane), a polyol, or any combination thereof. The core layer, the top layer, and/or the bottom layer can include a polymeric filler having particles of biaxially oriented polypropylene, a polymeric film, a packaging film, a barrier packaging film, a MRF residual, or any combination thereof. The core layer, the top layer, and/or the bottom layer can include an inorganic filler, a natural fiber filler, and/or fiberglass. The core layer can include at least one filler or additive that is not present in the top layer or the bottom layer. At least one of the top layer or the bottom layer can include at least one filler or additive that is not present in the core layer. The at least one surface layer of resin-impregnated paper can be or include phenolic paper. The at least one surface layer of resin-impregnated paper can be bonded to the top layer and/or the bottom layer with a glue.

In another aspect, the subject matter of this disclosure relates to a method of manufacturing a composite building material. The method includes: forming a core layer having a first type of polymeric fibers and a first binding agent, the first type of polymeric fibers having a first average fiber length; forming a top layer having a second type of polymeric fibers and a second binding agent, the second type of polymeric fibers having a second average fiber length different than the first average fiber length; forming a bottom layer having the second type of polymeric fibers and the second binding agent; applying at least one surface layer of resin-impregnated paper above the top layer and/or below the bottom layer; and heating and pressing the core layer, between the top layer and the bottom layer, and the at least one surface layer of resin-impregnated paper to form the composite building material.

In some instances, the first type of polymeric fibers and/or the second type of polymeric fibers can include fibers derived from at least one of carpet, automotive headliners, automotive sidewalls, automotive fabrics, insulation materials, or any combination thereof. The second average fiber length can be less than the first average fiber length. Each of the first type of polymeric fibers and the second type of polymeric fibers can include granulated polymeric fibers. Forming the core layer can include mixing the first type of polymeric fibers with the first binding agent, and forming the top layer and the bottom layer can include mixing the second type of polymeric fibers with the second binding agent. The first binding agent and/or the second binding agent can include methylenediphenyldiisocyanate (MDI), polyurea, polyurethane (e.g., a foamed polyurethane), a polyol, or any combination thereof. Forming the core layer can include applying the core layer over the bottom layer, and forming the top layer can include applying the top layer over the core layer.

In various examples, applying the at least one surface layer can include applying a surface layer from the at least one surface layer over the top layer. Applying the at least one surface layer can include bonding the at least one surface layer to the top layer and/or the bottom layer with a glue. The at least one surface layer can include phenolic paper. The core layer can have a substantially nonuniform thickness, and the core layer, the top layer, and the bottom layer together can have a substantially uniform thickness. The method can include performing a heat treatment on an edge of the composite building material.

In another aspect, the subject matter of this disclosure relates to a composite building material. The composite building material includes: a core layer including a binding agent and at least one of polymeric fibers or polymeric film particles; and at least one surface layer of resin-impregnated paper disposed above or below the core layer.

In certain implementations, the core layer can include the polymeric fibers, and the polymeric fibers can include a mixture of long polymeric fibers (e.g., having an average length greater than 25 mm) and short polymeric fibers (e.g., having an average length less than 25 mm). The mixture of long polymeric fibers and short polymeric fibers can include a bimodal distribution of fiber lengths (e.g., with a first peak at a short fiber length and a second peak at a long fiber length). The polymeric fibers can be derived from carpet, automotive headliners, automotive sidewalls, automotive fabrics, insulation materials, or any combination thereof. The core layer can include the polymeric film particles, and the polymeric film particles can include biaxially oriented polypropylene, a packaging film, a barrier packaging film, or any combination thereof. The binding agent can be or include methylenediphenyldiisocyanate (MDI), polyurea, polyurethane (e.g., a foamed polyurethane), a polyol, or any combination thereof.

In another aspect, the subject matter of this disclosure relates to a method of manufacturing a composite building material. The method includes the steps of: forming a core layer having a binding agent and at least one of polymeric fibers or polymeric film particles; applying at least one surface layer of resin-impregnated paper above and/or below the core layer; and heating and pressing the core layer and the at least one surface layer of resin-impregnated paper to form the composite building material.

In certain examples, forming the core layer can include adding the polymeric fibers, and the polymeric fibers can include fibers derived from at least one of carpet, automotive headliners, automotive sidewalls, automotive fabrics, insulation materials, or any combination thereof. Forming the core layer can include adding the polymeric film particles, and the polymeric film particles can include biaxially oriented polypropylene, a packaging film, a barrier packaging film, or any combination thereof. The binding agent can be or include methylenediphenyldiisocyanate (MDI), polyurea, polyurethane (e.g., a foamed polyurethane), a polyol, or any combination thereof.

In one aspect, the invention relates to a composite adapted for use as a building material, the composite including processed carpet waste, between about 2% and about 10% binding agent by weight of the composite, and between about 20% and about 30% natural fibers by weight of the composite in intimate association with the recycled carpet waste and the binding agent. In an embodiment of the above aspect, the composite includes about 5% binding agent, by weight. In another embodiment, the composite has about 30% natural fibers, by weight. In certain embodiments of the above aspect, the processed carpet waste includes a material selected from the group consisting of wool, nylon, polyester, polypropylene, jute, sisal, and combinations thereof. In certain embodiments of the above aspect, the natural fibers are selected from the group consisting of wood chips, wood flour, wood flakes, sawdust, flax, jute, hemp, kenaf, rice hulls, abaca, and combinations thereof.

In yet another embodiment of the above aspect, the composite includes an additive selected from the group consisting of a colorant, a fire retardant, a fiberglass, a mold inhibitor, and combinations thereof. In certain embodiments, the processed carpet waste is at least one of post-industrial waste and post-consumer waste. In other embodiments of the above aspect, after submersion testing according to ASTM D1037-96A, the composite exhibits water absorption of not more than about 3%, by weight. Other embodiments of the composite include processed carpet waste having a melted polypropylene and an unmelted nylon. In certain embodiments, the processed carpet waste is at least one of a pelletized carpet waste and a fiber carpet waste.

In another aspect, the invention relates to a method of manufacturing a composite adapted for use as a building material, the method including the steps of applying heat and pressure to a processed carpet waste and a binding agent to form the composite material, and cooling the composite material while applying pressure to the composite material. This aspect may include the step of processing carpet waste, wherein the processing step is at least one of chopping, shredding, grinding, contaminant separating, palletizing, agglomerating, pulverizing, fine grinding, and fiberizing the carpet waste. In some embodiments of the above aspect, the step of applying heat and pressure occurs in a first cycle press, and wherein the step of cooling the composite while applying pressure occurs in a second cycle press. In other embodiments, the step of applying heat and pressure and the step of cooling the composite while applying pressure occur in a first cycle press. In still other embodiments of the above aspect, the step of applying pressure heats the composite material to a temperature of about 100° F. to about 600° F., to a temperature of about 200° F. to about 550° F., to a temperature of about 340° F. to about 420° F., or to a temperature of about 420° F. to about 500° F. In yet another embodiment, the step of cooling the composite material while applying pressure cools the composite material to a temperature of about 300° F. to about 32° F., or to a temperature of about 250° F. to about 180° F., or to a temperature of about 80° F.

In another embodiment of the above aspect, the pressure applied during the applying heat step and the cooling step is substantially constant. Certain embodiments may include the processed carpet waste as an unmelted carpet waste. Additional embodiments include the step of mixing the processed carpet waste and the binding agent. In some embodiments of the above aspect, the composite has about 90% to about 98% processed carpet waste, by weight, or about 95% processed carpet waste, by weight. In another aspect, the invention relates to a composite building material manufactured according to the processes described above.

BRIEF DESCRIPTION OF THE DRAWINGS

Other features and advantages of the present invention, as well as the invention itself, will be more fully understood from the following description of the various embodiments, when read together with the accompanying drawings, in which.

DETAILED DESCRIPTION

It is contemplated that apparatus, systems, methods, and processes of the claimed invention encompass variations and adaptations developed using information from the embodiments described herein. Adaptation and/or modification of the apparatus, systems, methods, and processes described herein may be performed by those of ordinary skill in the relevant art and are considered to be within the scope of the disclosed invention.

It should be understood that the order of steps or order for performing certain actions is immaterial, so long as the invention remains operable. Moreover, two or more steps or actions may be conducted simultaneously.

In certain examples, a "fiber" can be a thread or filament having a length that is longer than its diameter (e.g., by a factor of about 10, 30, 100, 300, 1000, 3000, 10000, or more). Diameters of carpet fibers and other polymer fibers described herein can be, for example, from about 10 microns to about 50 microns, or about 30 microns.

In certain examples, a "film" can be a thin, flexible sheet of material having a thickness that is smaller than its length and/or width (e.g., by a factor of about 10, 30, 100, 300, 1000, 3000, 10000, or more). Thicknesses of BOPP and other films described herein can be, for example, from about 10 microns to about 40 microns, or about 25 microns.

In various examples, a "filler" can be or include a material that is added to or present in the composite building materials described herein. Inclusion of a filler does not require that any other ingredients or components also be present in the composite building materials. For example, when a layer in a composite building material includes a filler, the layer may include only the filler and no other ingredients or components. Alternatively or additionally, in addition to the filler, the layer may include other ingredients or components, such as, for example, a binding agent and/or polymeric fibers.

In certain examples, the new systems and methods can be used to process and combine recycled carpet waste with a binding agent to form a PC with equivalent properties to those PCs made with virgin plastics at reduced cost.

Figure 1:
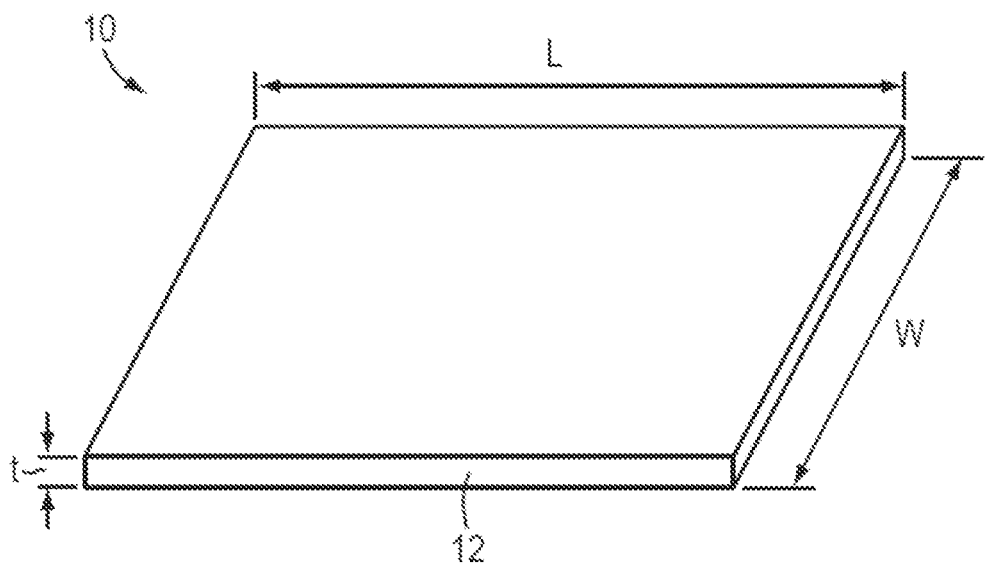
FIG. 1 is a perspective view of a plastic composite fabricated in accordance with one embodiment of the present invention.

FIG. 1 shows one embodiment of a sheet or board plastic composite 10 including recycled carpet waste formed in accordance with the present disclosure. The composite 10 is generally a dimensional composite body 12 formed from a mixture including recycled carpet waste and a binding agent. Length L, width W, and thickness t, of the composite 10 are dictated by the production machinery used. Functional performance parameters of the composite 10 may be defined in part by the amount of carpet waste, binding agent, natural fillers, and other optional additives. In general, however, the density of the composite 10 is directly related to the total amount of carpet waste used and the final thickness t of the board. The recycled carpet waste, which may be blended or dispersed with natural fillers within the fiber-polymer compound, can result in a composite having physical properties equivalent to PCs made with virgin thermoplastics. The recycled carpet waste may be processed into a fiber fluff, or other form, from post-industrial or post-consumer carpet waste. Depending on the composition of the carpet used, the recycled carpet waste can include wool, nylon, polyester, polypropylene, jute, sisal, like materials, and combinations thereof. Due at least in part to processing controls, described in greater detail in the following paragraphs, the recycled carpet waste is dispersed and distributed substantially uniformly throughout the composite 10. Various binding agents may be utilized as desired for a given application. Certain embodiments of a PC made in accordance with the present invention utilize methylenediphenyldiisocyanate (MDI) as a binding agent, a binding agent precursor, or a reactant used to form a binding agent. MDI can act as a binding agent for the fibers or agglomerated carpet waste materials to contribute to the structural integrity of the composite products. As an alternative to (or in addition to) MDI, binding can be accomplished using urea formaldehyde (UF), melamine urea formaldehyde (MUF), phenol formaldehyde (PF), one or more polyols, similar binding agents, and combinations of agents.

In addition to the binding agent, the composite 10 may incorporate natural fibers to help provide the composite with the appearance and feel of a natural wood product. Types of natural fibers, such as wood fillers or the like, include wood chips, wood flour, wood flakes, wood shavings, sawdust, flax, jute, abaca, hemp, kenaf, rice hulls, like materials, and combinations thereof. The sizes of the various natural fibers is not critical and may range from that of sawdust and wood flour, up to and exceeding 1" long wood chips, though fibers and chips less than about 0.5" may be preferred. The composite may include additives such as colorants, lubricants, flame retardants, compatiblizers, coupling agents, other materials, and combinations thereof. The relative amounts of components (i.e., recycled carpet waste, filler, additives, etc.) may be modified as desired for a particular application. The various component amounts, ratios of components, and finished composite properties in certain embodiments, are described in more detail below.

Unless otherwise noted, the use of one material when describing a particular application, process, or embodiment does not limit the described application, process, or embodiment to the specific material identified. The materials may be used interchangeably, in accordance with the described teachings herein. Moreover, the terms "PCs," "composite sheets," "composite materials," and the like, are used interchangeably herein to describe plastic composite boards or sheets made from recycled carpet waste or components thereof and optionally including one or more additives. In addition to PCs, other composite products may be manufactured utilizing, in whole or in part, recycled carpet waste. A non-limiting list of such composite products includes plastic piping, molded articles such as flower pots or seeding trays, building siding or roofing, trim boards, decking, fencing, furniture, or other types of extruded, injection molded, and/or compression molded products.

Figure 2:
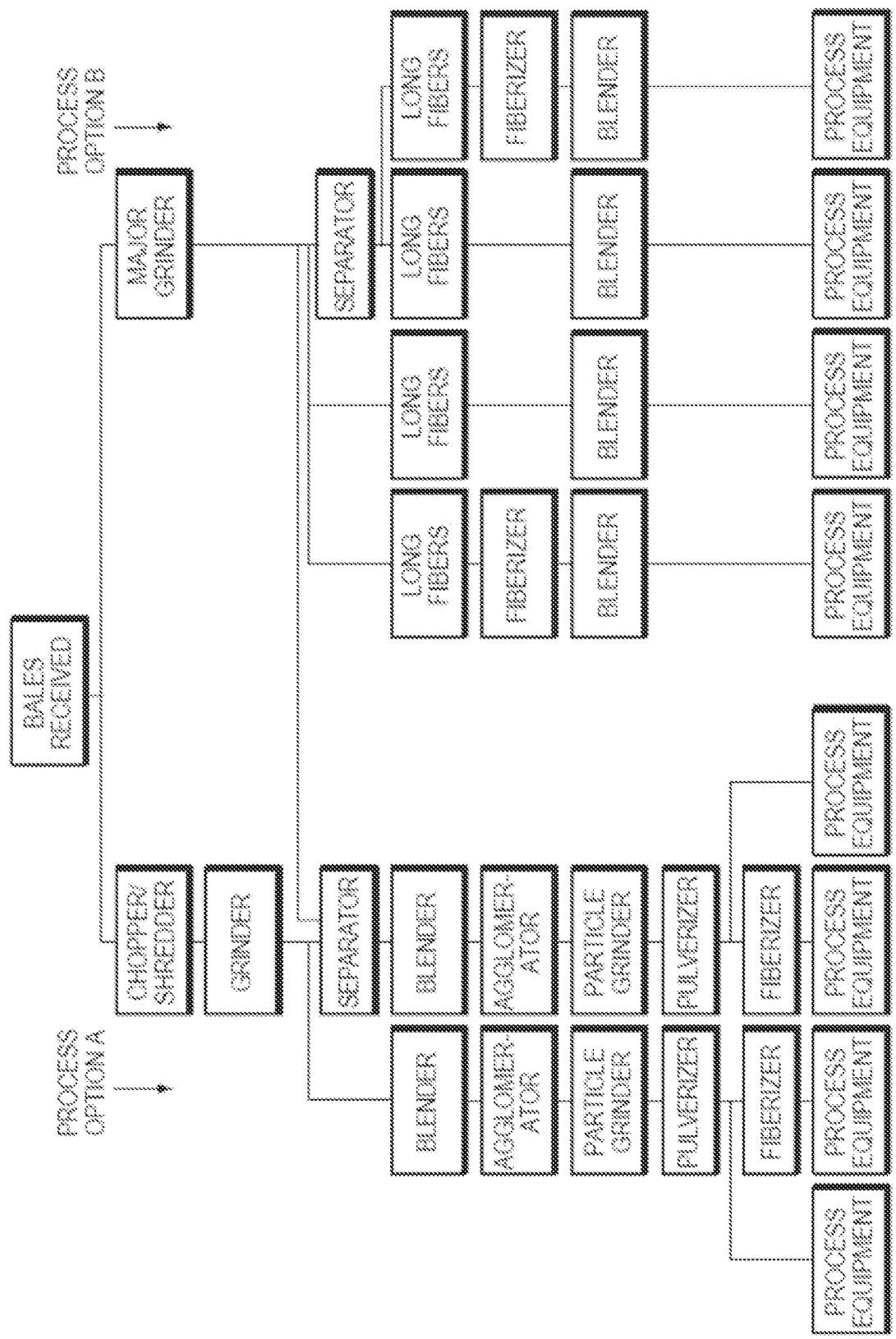
FIG. 2 is a flow chart depicting the types of size reduction equipment and the variety of size reduction procedures depending on the final carpet waste material form desired for the process equipment.

FIG. 2 shows the types of equipment and the variety of procedures for carpet waste size reduction, depending on the final form desired for the process equipment. The final form may also be dependent on the desired finished composite product and physical or visual appearance properties. In short, the carpet waste is processed as described below to reduce its size or generate small pieces, particles, and/or fibers of the carpet waste. The size-reduced carpet waste is then mixed or coated with a binder or binding agent to produce material that is subjected to temperature and/or pressure to yield the composite material. The size reduction process may take place at the same facility where the PCs are manufactured, or the carpet waste may be processed at a first facility and delivered to a second facility for incorporation into the PC products. Post-manufacture treatments for the composite material are also described below.

The carpet waste can include selvedge, post-industrial carpet waste, post-consumer carpet waste, and/or waste carpet reclaimed from landfills. Post-industrial carpet waste refers generally to waste material produced as a byproduct to the manufacturing process, such as trimmed carpet segments, as well as to carpet that fails to pass quality or other inspections, thus rendering it unsuitable for consumer use. Post-consumer carpet waste refers generally to carpet waste that is generated during installation at a consumer site or that is removed from a consumer site during demolition and/or replacement. Regardless, the terms selvedge, carpet waste, waste carpet, reclaimed waste, recycled waste, and similar terms are used herein interchangeably and may be used in the processes described herein interchangeably. These materials generally will be in baled form to begin the size reduction phase of the pre-processing. The bales vary in size but usually are about 1000 lb. to about 2000 lb. Some or all of the equipment described in the carpet reduction processes below may be supplied by PALLMANN MASCHINENFABRIK GMBH, DIEFFENBACHER GMBH, ROTOGRAN, VECOPLAN, WEIMA, or other manufacturers that produce similar equipment. Alternative manufacturers of specific equipment are identified below.

The first step in the size reduction phase includes reducing the waste to a manageable size for the remainder of the process. As depicted in FIG. 2, either a combination of a shredder/chopper and grinder (Process Option A), or a major capacity grinder (Process Option B) is used to process the materials to smaller sizes. Process Option A may be used to reduce carpet waste to pellets or granules that may be further processed into various PC products. The shredder/chopper first reduces the selvedge or carpet waste to chunks approximately three inches square (3"×3"), although other sizes are contemplated, depending on the equipment used. In addition to Pallmann Maschinenfabrik, the shredder/chopper may be manufactured by DIEFFENBACHER, ROTOGRAN, METSO, GMBH, VECOPLAN, LLC, OR WEIMA AMERICA, Inc. The shredded material then passes through a grinder which further reduces the chunks to a fiber fluff material with a diameter of the fibers similar to the diameter of the original carpet fibers and a length of about 0.25" to about 1". Other manufactures of comparable grinders include VECOPLAN, LLC, ROTOGRAN, CUMBERLAND ENGINEERING Corp., and REPUBLIC MACHINE, Inc.

The waste optionally can be run through a separator which acts as a hammer mill/cyclone to remove the dirt from the carpet waste. In this step, some of the carpet backing containing inorganic fillers may also be removed. Generally, however, it is unnecessary to deliberately separate the various carpet components prior to incorporating the recycled carpet waste into PCs. All of the components of carpet may be used, not only one component, such as the carpet fibers, as certain methods may disclose. Thus, manufacturing time is decreased, since the step of component separation may not be utilized. The slightly size reduced material, due to the hammer mill effect, is ready for the next step, the agglomeration process, while the dirt and carpet backing materials that may have been removed from the small chunks can be disposed. Carpet backing that is not removed, however, does not have any adverse effect when incorporated into a PC using recycled carpet waste. The fiber fluff, regardless of the use of the separator or not, also may be blended with other materials such as wood or natural fibers, synthetic fibers (i.e., fiberglass), inorganic fillers, or other reinforcing fillers. The fiber fluff material or the blended material can then be conveyed to the agglomeration step.

The agglomeration of the above materials occurs inside the agglomerator. The materials enter a horizontal drum containing a revolving rotor that is shaped so as to force the fiber fluff or blends against the drum wall. The drum wall is perforated so that, as the rotor forces the contained materials against the perforated wall, the material is forced through the perforations, thereby forming strands of a fixed diameter. On the outside of the drum are stationary knives which cut the strands into a fixed length. During this process, the material can be heated by friction to a temperature that remains below the melting point of the highest melting point material in the blend. The temperature is controlled by the speed of the rotor, the diameter of the perforations, and the thickness of the drum wall. As each component of the carpet waste (e.g., backing and carpet fibers) is pressed against the wall of the drum, the material can heat up due to friction, for example, until the material sufficiently softens and is pressed through the perforated drum by the rotor. The agglomerating machinery could be replaced by a pellet mill manufactured by Bliss Industries or California Pellet Mill Co.

The granules that are formed in the agglomeration step are generally cylindrical in shape and approximately 0.125" in diameter and about 0.125" to about 0.25" long, though other shapes and sizes can be achieved. The diameter and length of the granules can be modified by changing the diameter of the holes in the drum wall and/or changing the speed of the rotation against the knives. Because the granules are hot when they are formed and cut to length, some of the granules may be stuck to one another. Therefore, for better size consistency, the granules next pass through a grinder which separates any stuck granules. This grinder step may also be used to reduce the size of the granules, and/or the granules may be further reduced in size by a pulverizer. For example, if the final desired dimension is less than 0.125", the pulverizer may be used to reduce the particle size to 8-16 mesh. This is the equivalent of about 0.04" to about 0.10".

As an optional step, the granules or pulverized particles may be fiberized. The fiberizing process includes a mechanical roughing of the surface so that the surface takes on a fuzz-like characteristic that may be desirable for the composite product process described below. After processing to the desired condition, the material is then sent to the composite production process.

As an alternative to the above process, Process Option B may be used to reduce carpet waste to a fiberized mass. First, a major capacity grinder can reduce the carpet waste to fibers about 0.25" to about 1.0" in length (or other lengths, as described herein) and about $\frac{1}{32}$" to about 0.125" in diameter may be utilized. These random-sized fibers are ready for the agglomeration process or for alternative processes not requiring agglomeration. Next, the material optionally may be passed through a separator, as described above. The fibers may then be passed through the agglomeration process as described above, or the fibers may pass directly to the fiberizer equipment. Again, the fiberizer changes the surface characteristics of the fibers, giving them a fuzz-like surface with greater surface area and a different bulk density. The fiberizing step is again optional, and may not be required for all end uses of the composite products. Next, the fibers pass through a blender where wood or natural fibers, synthetic fibers (i.e., fiberglass), inorganic fillers, or mineral fillers (if any) may be added. Once the blending of the fibers and added materials is complete, the blend is ready for the composite production process.

Significantly, it has been determined that it is not necessary to separate or classify the various materials contained in selvedge or carpet waste, even though most carpet surface materials are nylons, polyester, polypropylene, or wool and the backing material is usually polypropylene and/or highly filled synthetic latex. These materials exhibit considerably different physical properties and processing properties, but the entire waste product may be used in the composite sheet material, regardless of the differences in the components that comprise the carpet waste. The waste carpet, having been made into an agglomerate, a fiberized agglomerate, a pulverized agglomerate, a fiberized, pulverized agglomerate, a fiberized fluff, etc., becomes the base material for the composite product. Additionally, other waste fiber or fiberized waste fiber may also be used to manufacture a composite product. The whole range of materials in carpet waste may be part of the composition. Alternatively or additionally, the composite material may include only certain portions from the carpet waste, such as, for example, carpet face fiber and/or carpet backing fiber.

Figure 3:
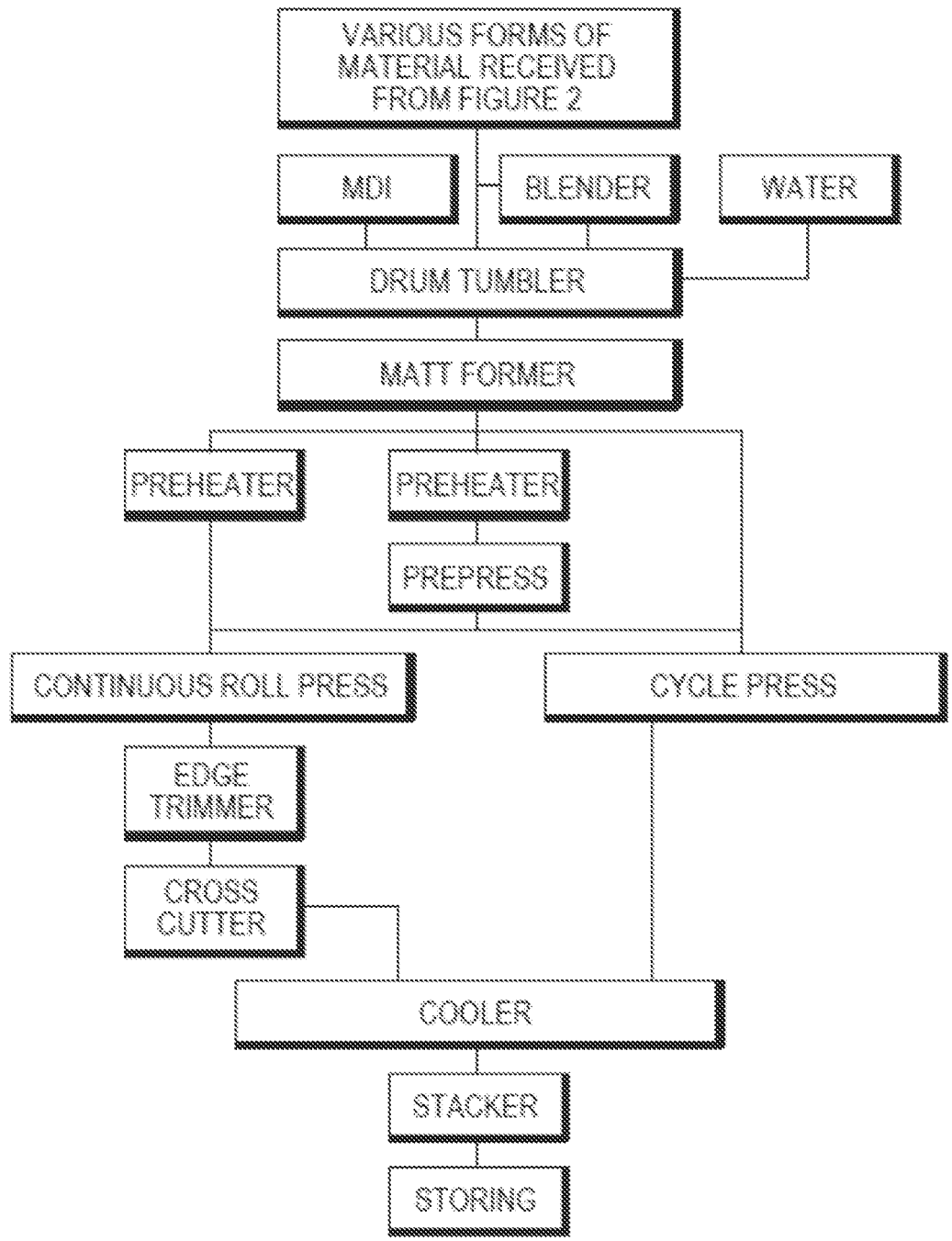
FIG. 3 depicts steps for coating the processed carpet waste material a bonding agent and subsequent forming process to produce the plastic composite product.

After the size reduction process(es), the carpet waste is ready to be formed into composite sheets, a process that is depicted in FIG. 3. The carpet waste materials may be loaded into a large rotating drum or a drum with rotating mixing blades and/or a resination blow line. This equipment is used to coat the carpet waste with a binding agent or precursors or reactants for the binding agent. Other materials such as natural fiber fillers, polymeric fillers, and/or inorganic fillers may be loaded with the carpet waste material. If the material is loaded into a drum, water and/or MDI (or other binding agent or binding agent reactants) can be sprayed out of the resination blow line to coat the materials, while the drum and/or blades spin to cause the material within to become evenly distributed. The addition of water may achieve a desired moisture content for the material and prepare the material for the binding agent. In some examples, the water and the MDI can react to form a binding agent that includes polyurea. For the resination blow line method, the material is blown through a tube that has water and MDI introduced into it. The blowing action causes the air to become turbulent which allows the water and MDI to evenly coat the material. In one embodiment, the binding agent is applied in this manner to the granules or fibers at a concentration of about 1% to about 20% of the total weight of the granules plus any other additives. Concentrations between about 2% to about 10% and about 5% to about 6% are also contemplated. Generally, higher concentrations of resin produce composite sheets with higher moduli of elasticity and rupture. This coated carpet waste dries rapidly under ambient conditions, allowing the granules or fibers to continue to flow without adhering to one another. Accordingly, once coated and dried, the resin coated particles need not be used immediately, and may be stored and/or transported for later use.

The MDI-coated carpet waste and other additives (if applicable) are conveyed to a mat forming station that includes conveyors, metering scales, spreader heads and a control management system. The spreading equipment distributes the material onto a forming belt such that the spread material becomes a mat which has a generally uniform thickness, width and initial density. Board properties may be determined by the shape of the carpet waste composite particles/fibers and by their position in the formed mat. Additionally, the forming station can distribute more than one type of material for a multi-layered board. For example, the spreader head in the forming station could spread a mat of fibers on the forming belt, then a second spreader head could spread a mat of pellets on top of the fibers, then a third spread head could spread a top layer of fibers onto the pellets. Many different combinations of materials can be spread onto the forming belt to make various types of boards. The number of layers per board also can be varied. For example, a board could be manufactured to have an outer layer of carpet waste with a fiberglass core, or an outer layer comprising carpet waste pellets, and carpet waste fiber underlayers with a carpet waste pellet core.

After the mat is spread formed, the forming belt then transports the mat into a pre-heater, a pre-press, or directly to a press machine. The pre-heater and pre-press may be utilized to reduce total processing time of the composite sheet. Due to the thermal inertia and thickness of the material, heat from the press platens or rolls may take longer to penetrate the total thickness of the mat, thereby extending process time and costs. Preheating brings the temperature of the entire mat up to a higher starting temperature. In some examples, the pre-heater can be located directly ahead of a press (e.g., a hydraulic press) and can be used to preheat the mat after the mat has been formed and/or pre-pressed, as described herein. The pre-press compresses the starting materials to a thickness that is more appropriate for introduction into the final presses and, additionally, the pre-heater and pre-press may be a single unit or separate units. In certain embodiments, the temperature of the mat can be elevated from about 65° F. to about 200° F. before entering the board forming process. This rapid heat transfer to the carpet waste may be accomplished by microwaves or by the injection of a steam/air mix (moist air) alternately from either surface into the mat. The steam can condense during this process, transferring the heat into the mat. The pre-heater may also pre-press or compress the material before it enters the board forming process. The heated mat is then transferred by an intermediate belt conveyor to the compression section of the infeed end of a continuous roll press or into a cycle press which is the beginning of the board-forming process.

In one embodiment, composite sheets are manufactured using a cycle press, which may have single or multi-daylight openings. Ranges of various process parameters for manufacturing various embodiments of PCs utilizing recycled carpet waste in a cycle press are presented in Table A-1, below. The composite material is transferred into the cycle press where it is subjected to temperature and pressure from a top and bottom platen that compresses the mat to a predetermined thickness or height. The elevated temperature and pressure activates the binding agent and, depending on the temperature, melts certain of the carpet components while leaving others unmelted, to produce in a finished board or sheet. During the cycle press process, steam may be injected into the mat to ensure thorough heating of the binding agent and bonding of the composite material. The cycle press may also use an active cooling cycle to reduce the temperature of the board before it exits the press. The platens may be engraved with a pattern to give the board outer surface a structured pattern.

TABLE A-1

| Composite Sheet Processing Parameters (Cycle Press) | | |
|---|---|---|
| | Range | |
| | High | Low |
| Total Time for heating material, during press-cycle [sec] | 360 | 60 |
| Temperature of Heating Plates [° F.] | 600 | 100 |
| Pressure of Heating Press [psi] | 600 | 150 |
| Internal Temperature of Board [° F.] | 500 | 340 |
| Cure Time [sec] | 400 | 30 |
| Transition Time from Heating to Cooling Press [sec] | 600 | 0 |
| Total Time for cooling material, during press-cycle [sec] | 360 | 60 |
| Temperature of Cooling Plates [° F.] | 300 | 32 |
| Pressure of Cooling Press [psi] | 600 | 150 |
| Internal Temperature of Board [° F.] | 300 | 70 |

Heat is generally delivered to the platens in the form of hot water, steam, electric coils, or circulating heated chemicals. In certain embodiments of the process, the platens may be heated from about 100° F. to about 600° F. Temperature ranges from about 200° F. to about 550° F., and about 340° F. to about 420° F. also may be desirable. Additionally, temperature ranges from about 420° F. to about 550° F. may be utilized. Final internal temperatures of the composite being compressed within the cycle press will be dependent at least in part on the temperature of the platens and compression time. If left in the cycle press for a sufficient period of time, the internal temperatures of the composite material will generally equal those of the platens, the ranges of which are given above. Final internal temperatures up to about 250° F., about 300° F., about 340° F., about 350° F., about 400° F., about 420° F., and about 480° F. have produced composite sheets displaying acceptable performance. Unlike known recycled carpet waste composite sheet material manufacturing processes, which heat the composite sheets to a temperature below the melting points of the carpet fibers and other carpet components, it has been discovered that heating the carpet waste to higher temperatures may be desirable. For example, temperatures of approximately 340° F. will melt polypropylene, a component in many modern carpet constructions, or other polymeric fillers (e.g., polyethylene or materials recovery facility (MRF) residuals containing a variety of polymers and/or other filler materials) without melting any nylon fibers (that melt at about 420° F.). The melted polypropylene, combined with binding agent resins of the types disclosed herein, form a sheet material having very desirable properties. The unmelted nylon provides additional structural strength to the finished composite and may increase flexural strength, though completely melting the carpet fibers can also produce a PC displaying acceptable performance properties. Pressures applied by the platens in the heating press may range from about 150 psi to about 6000 psi or greater, to obtain a the desired thickness and density.

The cycle press may include channels within the platens that thereafter circulate water or chemical coolant(s) to reduce the temperature of the board. The water or coolants may be chilled and volumetric flow rates controlled to reduce the total cooling time for the board to achieve acceptable manufacturing cycle time. This cooling step may take place in the heating press or the board may be transferred from the heating press to a cooling press. If the board is transferred from the heating press to the cooling press, the transfer time should be minimized to avoid warping of the PC. It has been determined that transfer time of less than about 600 seconds are acceptable. The cooling platens may have a temperature range of about 300° F. to about 32° F. Cooling temperature ranges from about 390° F. to about 65° F. may also be desirable. Ranges from about 250° F. to about 180° F. may also be utilized. If left in the cycle press for a sufficient period of time, the internal temperatures of the composite material will generally equal those of the platens, the ranges of which are given above. Final internal temperature of as high as 300° F., however, may be desirable to minimize warping of the composite sheet. Additionally, final internal temperatures of about 100° F., about 80° F., and about 70° F. have produced composite sheets displaying acceptable performance. The board is rapidly cooled under pressure to maintain its flatness. Due to its high polymer content, the board will usually warp if allowed to cool unrestrained using ambient air. Pressures applied by the platens in the cooling press may range from about 150 psi to about 6000 psi or greater.

Table B presents the ranges of various components that may be utilized in composite formulations to produce acceptable PCs. Specifically, materials utilized may include colorants, wood filler, fire retardants, fiberglass, mold inhibitors, binders, and recycled carpet waste. The recycled carpet waste can be about 20% to about 98% of the total formula weight and still retain acceptable physical properties in the composite sheet. Certain embodiments may include carpet wastes in the amount of about 90% to about 98% total weight. Still other embodiments may include carpet wastes in the amount of about 94% to about 95% total weight. It has been found that composites that utilize approximately 95% carpet waste and about 5% binding agent produce a composite that exhibits satisfactory performance while being economically advantageous, due to the low cost associated with using recycled carpet waste versus virgin materials. In other embodiments, a 9:1 ratio of carpet waste to MDI, up to a 49:1 ratio of carpet waste to MDI may be utilized. Table B also presents percentages of additives, such as wood filler, color, fire retardant, fiberglass, and mold inhibitor that may be added to the binder/carpet waste mixture. The percentages of these additives may be up to those identified in Table B, relative to the carpet waste/MDI content. Additionally, there is no discernible difference in the performance of the composite when using recycled carpet waste obtained from post-industrial carpet waste or post-consumer carpet waste, as compared with using virgin materials.

TABLE B

Formulation Ranges for Composite Sheets

| Material | Range Low % | High % |
|---|---|---|
| Carpet Waste | 10 | 98 |
| Moisture Content | 0 | 10 |
| Additives: | | |
| Binders: MDI | 2 | 20 |
| UF | 2 | 20 |
| MUF | 2 | 20 |
| PF | 2 | 20 |
| Wood filler | 0 | 65 |
| Color | 0 | 25 |
| Fire Retardant | 0 | 25 |
| Fiberglass | 0 | 50 |
| Mold Inhibitor | 0 | 25 |

Tables C-1 to C-4 present formulations and performance parameters for PCs made in accordance with the cycle press process described above. Tables C-1, C-2, and C-3 present this information for PCs made with different types of binding agents, but having the same total percentage of binding agents. The water absorption, thickness swell and moisture content testing was performed in accordance with the ASTM D1037-96A testing standard. The PC described in Table C-1 is made with MDI and has higher modulus of rupture (MOR) and modulus of elasticity (MOE) values, with lower moisture absorption properties.

TABLE C-1

Example 1 Formulations and Performance Properties

| Material | % |
|---|---|
| Carpet Waste | 90.2% |
| Moisture Content | 4.8% |
| Additives: | |
| Binders: MDI | 5.0% |
| UF | 0.0% |
| MUF | 0.0% |
| PF | 0.0% |
| Wood filler | 0.0% |
| Color | 0.0% |
| Fire Retardant | 0.0% |
| Fiberglass | 0.0% |
| Mold Inhibitor | 0.0% |
| total | 100% |
| Thickness (inch) | 0.250 |
| Density (pcf) | 53.3 |
| MOR (psi) | 1,866 |
| MOE (psi) | 80,331 |
| Tensile - Perpendicular [IB] (psi) | 728 |
| Tensile - Parallel (psi) | 14 |
| Linear Expansion | 0.10% |

TABLE C-1-continued

Example 1 Formulations and Performance Properties

| Material | % |
|---|---|
| Thickness Swell (inch) | 0.002 |
| Thickness Swell (%) | 0.00% |
| Moisture Content (%) | 0.27% |

Table C-2 presents information for a PC utilizing PF as the binding agent, that results in significantly lower, though still acceptable, MOR and MOE values.

TABLE C-2

Example 2 Formulations and Performance Properties

| Material | % |
|---|---|
| Carpet Waste | 90.2% |
| Moisture Content | 4.8% |
| Additives: | |
| Binders: MDI | 0.0% |
| UF | 0.0% |
| MUF | 0.0% |
| PF | 5.0% |
| Wood filler | 0.0% |
| Color | 0.0% |
| Fire Retardant | 0.0% |
| Fiberglass | 0.0% |
| Mold Inhibitor | 0.0% |
| total | 100% |
| Thickness (inch) | 0.250 |
| Density (pcf) | 48.0 |
| MOR (psi) | 971 |
| MOE (psi) | 49,600 |
| Tensile - Perpendicular [IB] (psi) | 716 |
| Tensile - Parallel (psi) | 58 |
| Linear Expansion | 0.54% |
| Thickness Swell (inch) | 0.007 |
| Thickness Swell (%) | 2.97% |
| Moisture Content (%) | 4.12% |

Table C-3 presents information for a PC manufactured with a mixture of MDI and UF as binding agents. While this formulation displays performance characteristics higher than those listed for the Table C-2 sample, the performance values are not as high as the sample using MDI as the binding agent, presented in Table C-1.

TABLE C-3

Example 3 Formulations and Performance Properties

| Material | % |
|---|---|
| Carpet Waste | 90.2% |
| Moisture Content | 4.8% |
| Additives: | |
| Binders: MDI | 1.25% |
| UF | 3.75% |
| MUF | 0.0% |
| PF | 0.0% |
| Wood filler | 0.0% |
| Color | 0.0% |
| Fire Retardant | 0.0% |
| Fiberglass | 0.0% |
| Mold Inhibitor | 0.0% |
| total | 100% |
| Thickness (inch) | 0.250 |
| Density (pcf) | 45.4 |
| MOR (psi) | 1.359 |

TABLE C-3-continued

Example 3 Formulations and Performance Properties

| Material | % |
|---|---|
| MOE (psi) | 66,716 |
| Tensile - Perpendicular [IB] (psi) | 1002 |
| Tensile - Parallel (psi) | 44 |
| Linear Expansion | 0.31% |
| Thickness Swell (inch) | 0.007 |
| Thickness Swell (%) | 2.78% |
| Moisture Content (%) | 3.02% |

Table C-4 presents a composite sheet utilizing 25% wood filler, with double the amount of binding agent utilized in the Table C-1 through Table C-3 samples. Estimates of the performance properties of this sample utilizing wood filler are identified with an asterisk.

TABLE C-4

Example 4 Formulations and Performance Properties

| Material | % |
|---|---|
| Carpet Waste | 60.0% |
| Moisture Content | 5.0% |
| Additives: | |
| Binders: MDI | 10.00% |
| UF | 0.00% |
| MUF | 0.0% |
| PF | 0.0% |
| Wood filler | 25.0% |
| Color | 0.0% |
| Fire Retardant | 0.0% |
| Fiberglass | 0.0% |
| Mold Inhibitor | 0.0% |
| total | 100% |
| Thickness (inch) | 1.000 |
| Density (pcf) | 66.7 |
| MOR (psi) | 2,815 |
| MOE (psi) | 236,000 |
| *Tensile - Perpendicular [IB] (psi) | 1500 |
| *Tensile - Parallel (psi) | 100 |
| *Linear Expansion | 0.40% |
| *Thickness Swell (inch) | 0.010 |
| *Thickness Swell (%) | 3.00% |
| *Moisture Content (%) | 3.00% |

The differences in the performance properties of the above-identified examples indicate that the types and amounts of binders may be varied as desired to achieve acceptable results. Binder type and amount may be varied to adjust cost or other properties. Although particular embodiments have not yet been tested, additives such as fire retardants may be added to produce a composite sheet having a Class A fire rating.

According to an alternative embodiment, the PC may be manufactured using a continuous roll process. The continuous roll press can utilize a double-belted press capable of maintaining a range of temperatures and pressures on the mat to allow the binding agent reaction and/or melting of select components to take place. The continuous roll press belts may be steel or other material. Process parameters for a continuous roll press are depicted in Table A-2. Temperatures utilized are generally similar to those utilized in the cycle press process.

TABLE A-2

Composite Sheet Processing Parameters (Continuous Roll Press)

| | Range | |
|---|---|---|
| | High | Low |
| Temperature of Heating Rolls [° F.] | 600 | 100 |
| Pressure of Heating Rolls [psi] | 6000 | 150 |
| Internal Temperature of Board [° F.] | 500 | 340 |
| Temperature of Cooling Plates [° F.] | 300 | 32 |
| Pressure of Cooling Rolls [psi] | 6000 | 150 |
| Internal Temperature of Board [° F.] | 300 | 70 |

For example, pressures from about 150 psi to about 6000 psi are used to squeeze the fiber mat to the desired thickness and density of the final product. The continuous roll press consists of a press structure that tensions the belts. In general, the press includes a number of frame units, depending on the length of the press and pressure that is required for a particular application. Cylinders arranged at the frame units in various combinations exert the desired pressure. The press includes top and bottom heated platens which roller rods and the belts travel over. The press has an infeed head to guide the roller rods, belts and mat to be pressed. The roller rods are located between the heated platens and the belts and support the mat as it is moved from one cylinder to the next. The belts are driven by two or more drums at generally opposite ends of the roll press. Drum scrapers may be used to keep the board from sticking to the belts. A release agent also may be sprayed onto the belts to keep the mat from sticking to the belts, allowing the composite to exit easily the press at the completion of forming. A control system regulates the operation of the press, such as the speed of the belts, temperature, pressure, thickness of the mat, etc.

The continuous roll press transfers heat to the binding agent-coated composite material. As the heat activates the coating, the cylinders press the mat together to achieve the desired thickness. Thus, while the mat material moves from the infeed section of the press, the mat's thickness is reduced while being heated to a temperature that ensures activation of the binding agent and melting of certain fibers. As the mat moves through the continuous roll press, the platens gradually reduce the thickness of the mat to a predetermined thickness. Depending on the amount of material introduced to the infeed section of the press, the density of the finished board can be directly related to its final thickness.

After the binding of the material and desired height dimension of the mat has been reached in a continuous roll press, a board is formed which is in the shape of a continuous ribbon or sheet. When the ribbon exits the press, it undergoes a continuous edge trimming operation to reach the desired width and then it is cross-cut to a pre-selected length. The ribbon is transported through the trimming and cross-cutting operations by a roller conveyor and pinch rollers. The cut boards are then transported to a cooling station. The cooling station can employ a variety of different machines such as a star cooler, with subsequent stacking, or a stacking roller conveyor. The star cooler is a large diameter wheel with multiple rows of spoked arms extending from the wheel. The arms lift each board from the conveyor and allow the boards to rotate with the wheel and be air cooled. If needed, the continuous roll press can have a cooling section with chilled rollers near the press outlet. This will cool the board (as described above) eliminating the need for further cooling. The board is then conveyed to a stacking operation and stored for future use. Alternatively the boards may be conveyed to a separate cooling press as described above.

The boards are now ready to be shipped or they can go through a variety of decorating alternatives.

Figure 4:
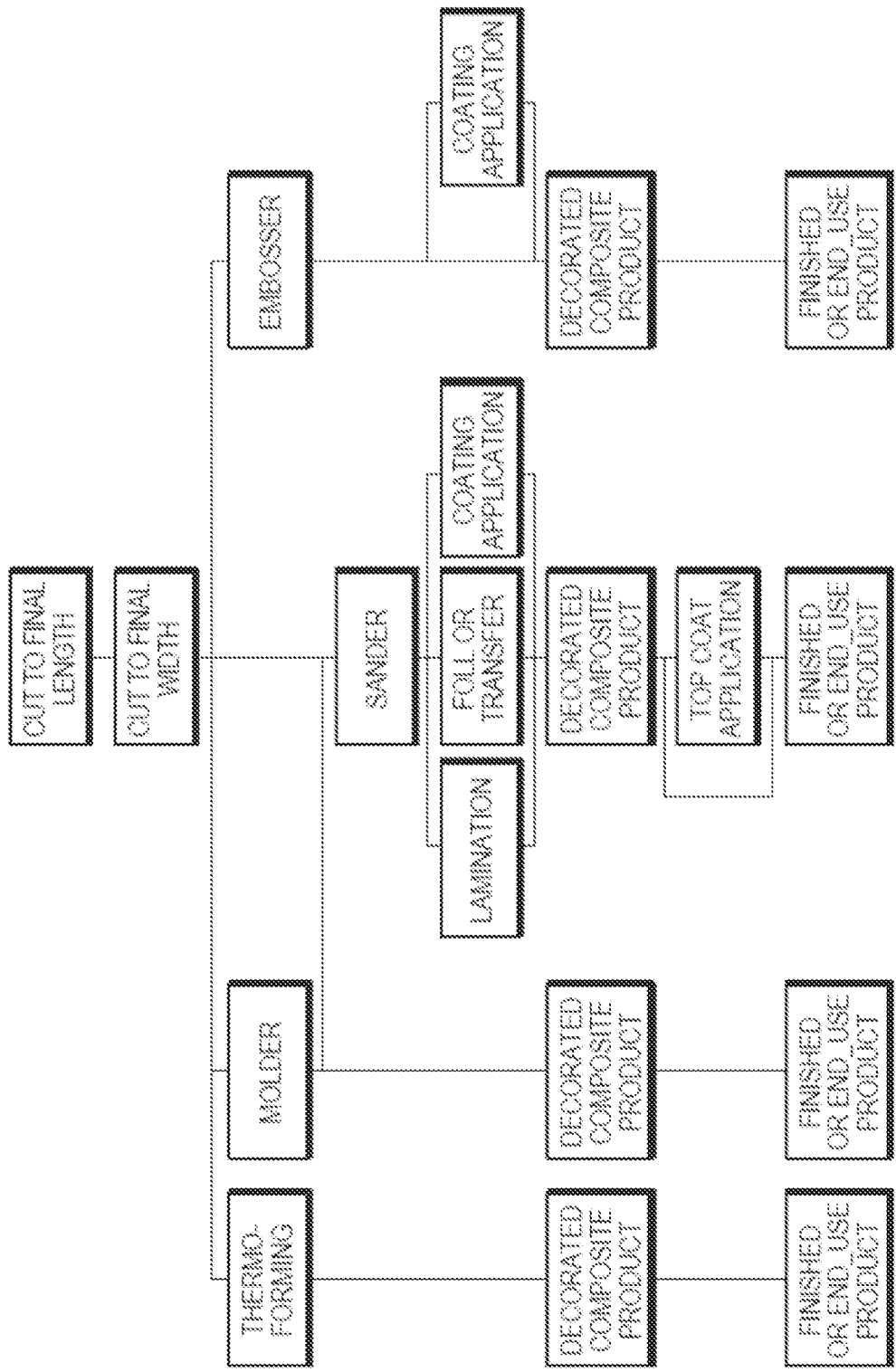
FIG. 4 depicts steps for finishing the plastic composite product.

FIG. 4 shows the finishing and decorating steps that may be employed following cutting to final width. The composite product can now be processed further to change the cross-sectional profile to take on the shape required in the finished product. The processing can be done on a variety of cutting machines of different designs, the most common of which is a molder using rotating knives. This machine allows for the setting of the knife blades to adjust the cut to the desired profile (e.g., siding or molding having a non-rectangular profile). Another common device is the router which cuts a specific groove or grooves (routs) into the surface of the composite product. The router has the same effect as the molder in that it changes the initial profile out of the process into the desired profile required for the final product.

The profile may also be changed using thermoforming methods. In this case, the composite product is placed in a mold of the desired profile and with heat and pressure the product takes on the shape of the mold. This profile change offers an additional decorating capability in that the desired color and/or pattern may be on a transfer foil placed in the mold. With the application of the heat and pressure during the process, the color and/or pattern are transferred from the carrier foil to the composite product. Thus, at the end of the thermoforming process, the composite product has the desired profile and also the desired decoration.

The composite product may be embossed after manufacturing. The embossing is accomplished with an embossing plate or roll. The plate or roll has the pattern to be transferred to the product on the surface of the plate or roll. This surface is heated to a temperature that will soften the surface of the composite product. Then the plate or roll is pressed onto the surface of the product to give the desired pattern transfer. As the surface of the composite product cools, the embossing pattern becomes fixed on the surface of the composite product. The embossed composite product is now ready to be coated, or if no coating is required for the end-use product, it is ready for packaging.

Composite products that will be decorated may first pass through a sander. This smoothing of the surface prepares the product for coating, transfers, and laminating. The sanded or embossed composite product may be coated with primers, finish paints, or stains. The coating application employs various conventional spray techniques using exhaust systems to remove the excess spray and solvents. Either penetrating or film-forming coatings may also be applied, and the choice is dependent on the desired finished product appearance and application. The sanded composite product can also act as a core to which decorative and protective layer(s) may be hot stamped from a foil or film or laminated to achieve improved physical and visual enhancement. In this regard, U.S. patent application Ser. No. 11/054,258, filed Feb. 9, 2005, and published as U.S. Patent Application Publication No. 2006/0147693, and U.S. Provisional Patent Application Ser. No. 60/641,308, filed Jan. 4, 2005, describe exemplary processes and are incorporated by reference herein in their entireties.

The composite product also may be decorated using transfer foils. Once again the product is first sanded to smooth the surface, then an adhesive layer is applied to the profile using a conventional application technique. The transfer foil has the desired color and/or pattern on a polymeric substrate, and is brought into contact with the surface of the product using stamping equipment designed for the specific application. Using heat and pressure, the color and/or pattern is transferred from the foil to the product. The heat required for the transfer activates an adhesive layer on the surface of the profile ensuring bonding of the decoration to the profile. With the color and/or pattern now on the composite product, the spent foil is then collected for disposal, and the finished product has the desired decorated effect.

Another decorating method that may be employed is lamination. Several materials may be used as the laminate surface, such as wood veneers, synthetic veneers, foils, films, and polymeric sheets. The application of rigid laminates like wood veneers is done using conventional laminating equipment. Generally, an adhesive system (either a wet adhesive system or a hot-melt adhesive system) employing a primer and an adhesive is applied to the PC substrate. The rigid surface laminate is then applied to the substrate and heat and pressure are applied. After heating and pressing, the laminated product is then set for a fixed period of time to allow the adhesive system to cure. In the case of the composite product, the composite product is the substrate. The adhesive system, usually a hot-melt adhesive, is applied to the composite product. The rigid veneer is then placed on the adhesive layer forming a sandwich of composite product, adhesive, and rigid laminate. The sandwich is then pressed to secure the bond of the laminate to the composite product. After curing, the laminated product with the desired decorative appearance is ready for packaging.

Another laminating technique used with the composite product is foil laminating. This technique can be referred to as wrapping; wherein, the composite product profile is wrapped in the decorative foil. After the composite product profile has been sanded, the profile passes through a wrapping device that takes the foil wrap from a coil then applies the adhesive (and primer, if required) to the foil. In a continuous process, the foil wrap is then passed over the composite product profile. Using a series of rollers, the foil wrap is shaped to the composite product profile. The foil wrap may incorporate an integral topcoat material, such as polyurethane, acrylic, or other protective materials, for physical property enhancement. If, however, the foil wrap integrates only the decorative elements, then the wrapped composite product will require a separate topcoat for certain applications.

If the end-use product application requires significant surface property enhancements, such as abrasion resistance, a topcoat may be added to the decorating process. The topcoat can be polyurethane, acrylic, or other protective material that will impart better physical properties to the surface of the wrapped finished product. The topcoat may be spray applied or hot melt applied. If spray applied, the wrapped composite product will pass through a spray applicator and then may or may not pass through a curing device, such as an ultra-violet radiation station. If the topcoat is hot melt applied, then a layer of polyurethane is applied to flat surfaces of the decorated composite product. The cure process for this type of material is time dependent and could take several days depending on the hot melt topcoat chosen for a specific end-use application for the completed finished product.

Figure 5A:
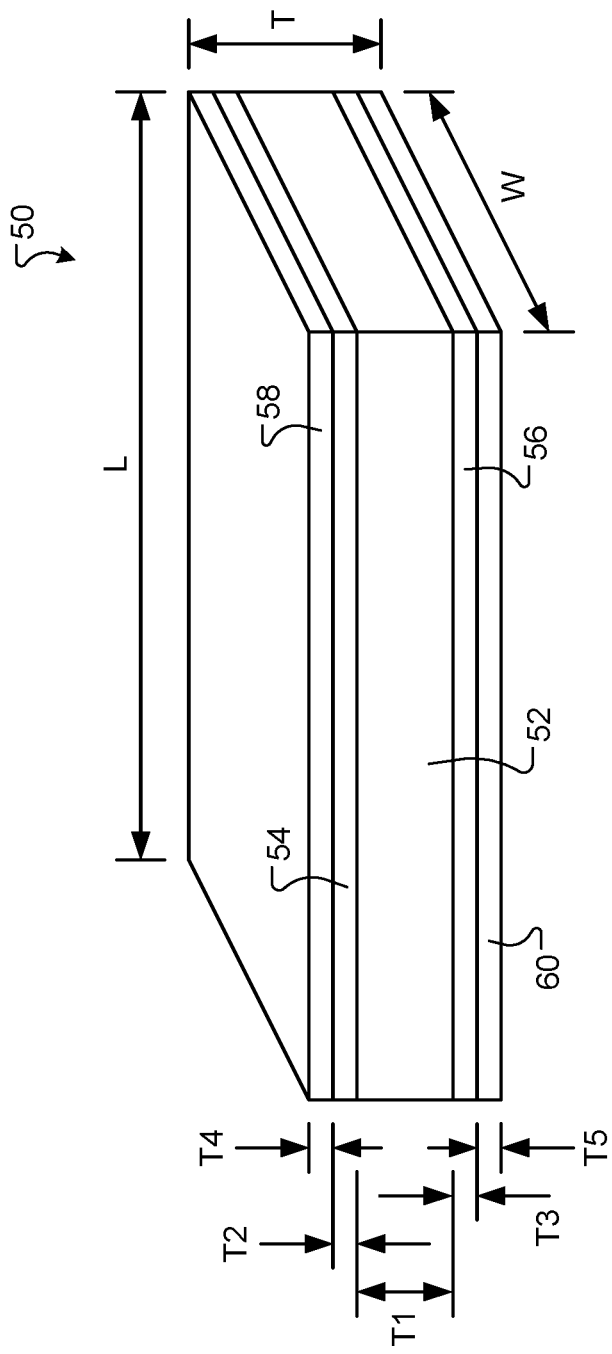
FIG. 5A is a schematic, perspective view of a composite having multiple layers of carpet fiber, binding agent, and optional fillers, in accordance with certain embodiments.

Referring to FIG. 5A, in various examples, a composite material 50 includes a core layer 52, a top layer 54 disposed above the core layer 52, a bottom layer 56 disposed below the core layer 52, a top surface layer 58 disposed above the top layer 54, and a bottom surface layer 60 disposed below the bottom layer 56. The composite material 50 can be in the form of a sheet or board having a thickness T, a width W, and a length L. The thickness T can be, for example, from about 6 mm to about 40 mm, the length L can be from about 10 cm to about 5 m, and the width W can be from about 25 mm to about 1.2 m. In general, the thickness T, the length L, and/or the width W can depend on an intended use or application for the composite material 50. The composite material 50 can be used for interior or exterior building applications, including, for example, siding, trim, molding, panels, roofing, decking, or other building products. While a cross-section of the composite material 50 is depicted in FIG. 5A as being rectangular, other cross-sectional profiles can be used. For example, the thickness T can vary within the composite material 50 (e.g., along a dimension corresponding to the length L or the width W) to obtain a variety of profiles for siding (e.g., a tapered profile), molding (e.g., a curved profile), or other products.

Table D includes low, typical, and high values for the thicknesses (e.g., average thicknesses) of the composite material 50, the core layer 52, the top layer 54, the bottom layer 56, the top surface layer 58, and the bottom surface layer 60, in accordance with certain examples. The values for the core layer thickness T1, the top layer thickness T2, and the bottom layer thickness T3 are presented as percentages of the total thickness T. In some examples, when the total thickness T is high (e.g., about 40 mm), the values for the top layer thickness T2 and the bottom layer thickness T3 can be near the lower ends of the respective ranges of the table (e.g., near 5% of the total thickness T). Likewise, when the total thickness is low (e.g., about 6 mm), the values for the top layer thickness T2 and the bottom layer thickness T3 can be near the upper ends of the respective ranges in the table (e.g., near 40% of the total thickness T). Such values for the top layer thickness T2 and the bottom layer thickness T3 can be used to achieve desired performance characteristics for the composite material 50 (e.g., a desired stiffness) and/or may be used to achieve a substantially uniform combined thickness of the core layer 52, the top layer 54, and the bottom layer 56, as described below.

TABLE D

Average thickness values for composite material.

| Average Thicknesses | Low | Typical | High |
| --- | --- | --- | --- |
| Total Composite Thickness T (mm) | 6 | 25 | 40 |
| Core Layer Thickness T1 (% of Thickness T) | 20 | 65 | 90 |
| Top Layer Thickness T2 (% of Thickness T) | 5 | 25 | 40 |
| Bottom Layer Thickness T3 (% of Thickness T) | 5 | 10 | 40 |
| Top Surface Layer Thickness T4 (mm) | 0.1 | 0.3 | 1 |
| Bottom Surface Layer Thickness T5 (mm) | 0.1 | 0.3 | 1 |

In certain implementations, the core layer 52, the top layer 54, and the bottom layer 56 can each include polymeric fibers, a binding agent, and optionally one or more fillers and/or additives. The polymeric fibers can be or include, for example, nylon fibers, polyester fibers, polypropylene fibers, bicomponent fibers, other types of fibers, or any combination thereof, and can be derived from carpet, carpet waste, automotive headliners, insulation materials, or other sources, as described herein. Polymeric fibers derived from carpet or carpet waste can be referred to herein as "carpet fiber." Additionally or alternatively, polymeric fibers can be obtained from scrap, used, new, and/or recycled fiber sources, such as, for example, interior automotive surface materials (e.g., automotive headliners, sidewalls, floor mats, or automotive fabrics), thermal insulation materials, sound insulation materials, industrial or commercial fabrics (e.g., polyester woven fabric), cushions, pads, carpet tiles, product waste or recycling streams, or any combination thereof.

In some examples, the core layer 52, the top layer 54, and/or the bottom layer 56 can include any portion of carpet or carpet waste, including face fibers, backing, inorganic materials, contaminants (e.g., dirt or sand), and/or adhesives. Alternatively or additionally, the core layer 52, the top layer 54, and/or the bottom layer 56 may include only one or more portions of the carpet or carpet waste, such as face fibers.

The binding agent can be or include, for example, a polyurea, a polyurethane, an isocyanate, one or more polyols, or other suitable binding agent materials or precursors. In some instances, for example, the binding agent can be or include a polyurea derived from a reaction between MDI and water. Additionally or alternatively, the binding agent can be or include a polyurethane derived from a reaction between MDI (or other isocyanate) and a polyol. The polyol can be or include, for example, a polyether polyol or a polyester polyol, such as polyethylene oxide, polyethylene glycol, or polypropylene glycol. The polyurethane can be or include a foam, such as a rigid polyurethane foam and/or a closed-cell polyurethane foam. The reaction to form the polyurethane foam can utilize or involve auxiliary materials, such as one or more catalysts, foaming agents, and/or stabilizers. Advantageously, use of foamed materials can significantly reduce a weight of the resulting composite materials. In some examples, the binding agent can include or be derived from MDI (or other isocyanate), urea formaldehyde (UF), melamine urea formaldehyde (MUF), phenol formaldehyde (PF), and/or one or more polyols.

The fillers for the core layer 52, the top layer 54, and the bottom layer 56 can be or include, for example, polymeric fillers, natural fiber fillers, inorganic fillers (e.g., mineral fillers), and/or fiberglass. The polymeric fillers can be or include various single layer films and/or multilayer films, which can be or include, for example, barrier packaging films. Such polymeric fillers can include, for example, single or multilayer films having biaxially oriented polypropylene (BOPP), nylon, polyvinylidene dichloride (PVDC), ethylene vinyl alcohol (EVOH), metallic or other impervious materials or layers, or any combination thereof. Such polymeric fillers can be obtained or derived from food packaging or other scrap or waste sources. BOPP and/or other films can be shredded and/or granulated (e.g., to form particles) prior to being used as a filler, as described herein. Additionally or alternatively, polymeric fillers can be or include recycled polymeric materials obtained from a recycling facility, such as a materials recovery facility (e.g., MRF residuals) or a commercial waste disposal operation. In some instances, the polymeric fillers can be or include fibers that are recycled or sourced from used, old, or waste fiber materials (e.g., manufacturing scrap), including clothing (e.g., jackets, shirts, and/or pants), paint rollers, and shoddy fiber (e.g., from cushions). Other suitable polymeric fillers can include, for example, granulated or shredded polyethylene, polypropylene, polyester, and/or nylon, in film or non-film form.

In some implementations, the composite building materials described herein can include polymeric filler (e.g., polymeric film particles) but little or no polymeric fibers. Such composite building materials can include, for example, binding agent and polymeric filler, and optionally one or more additional fillers and/or additives. It is presently discovered that such composite building materials having polymeric filler but little or no polymeric fibers can have certain performance benefits over composites that include polymeric fibers or greater amounts of polymeric fibers. The improved performance benefits can include, for example, less water absorption, which can result in composites that exhibit less swelling due to moisture exposure and/or fewer issues related to mold or mildew. For example, polymeric fillers such as BOPP or barrier packaging films can be generally impervious to water and/or can absorb little or no moisture. By comparison, polymeric fiber (e.g., carpet fiber) can have a more porous structure and/or can be more susceptible to moisture absorption. Additionally or alternatively, composites made with polymeric fibers (and little or no polymeric film materials) may exhibit more thermal expansion and/or contraction due to temperature changes, compared to composites made with polymeric film materials (and little or no polymeric fibers).

The natural fiber fillers can include, for example, wood chips, wood flour, wood fibers, wood flakes, wood shavings, sawdust, flax, jute, abaca, hemp, kenaf, rice hulls, like materials, other cellulosic fillers, or any combination thereof. The inorganic fillers can include, for example, talc, silica, calcium carbonate, fly ash, like materials, or any combination thereof. The additives can include, for example, one or more colorants, fire retardants, mold inhibitors, and/or compatibilizers.

In various examples, the polymeric fillers, natural fiber fillers, inorganic fillers (e.g., mineral fillers), and/or fiberglass can be used to achieve or adjust certain performance characteristics for the composite material 50. For example, polymeric fillers (e.g., BOPP or other single or multilayer films and/or MRF residuals) can decrease water absorption and/or avoid or minimize dimensional changes in length and thickness caused by water absorption. Natural fiber fillers (e.g., cellulose fillers) can increase modulus of elasticity (MOE), modulus of rupture (MOR), and/or coefficient of thermal expansion, which can be desirable; however, natural fiber fillers may also increase water absorption and dimensional changes caused by the water absorption, which can be detrimental. Inorganic fillers (e.g., fly ash or talc) can reduce water absorption and, in certain percentages, can increases MOE and MOR. Fiberglass fillers can increase MOE and MOR while simultaneously reducing water absorption and associated dimensional changes. Fiberglass fillers can be obtained from a variety of sources, including, for example, recycled wind turbine fan blades, boat hulls, machine components, construction materials, and the like.

To take advantage of the benefits of some of these fillers, a concentration of filler can be different in the core layer 52 than in the top layer 54 and/or the bottom layer 56. This can allow the amount of filler in the composite material 50 to be adjusted by changing the thickness of the core layer 52, relative to the thicknesses of the top layer 54 and the bottom layer 56. For example, if the core layer 52 contains a higher concentration of certain fillers (e.g., natural fiber filler), the amount of filler in the composite material 50 can be increased by increasing a thickness of the core layer 52. In this way, material properties of the composite material 50 can be adjusted by varying relative thicknesses of the core layer 52, the top layer 54, and the bottom layer 56.

Additionally or alternatively, the core layer 52, the top layer 54, or the bottom layer 56 can include one or more fillers or additives that are not present (or are present in lower concentrations) in one of the other layers. For example, the core layer 52 can include a filler (e.g., natural fiber filler or fiberglass) or an additive (e.g., a compatibilizer) that is not present in the top layer 54 and/or the bottom layer 56. Additionally or alternatively, the top layer 54 or the bottom layer 56 can include a filler or an additive that is not present in the core layer 52. This approach can allow fillers or additives to be used only in layers where they are needed or most helpful, or it can avoid using fillers or additives in layers where they are detrimental. For example, in some instances, it can be desirable to avoid using natural fiber fillers near an exterior surface of the composite material, because such use may increase moisture absorption and/or lead to mold or mildew problems.

Still referring to FIG. 5A, in various examples, the top surface layer 58 and/or the bottom surface layer 60 can be or include one or more layers of a resin-impregnated paper, which can include a cellulose-based paper and a resin. The resin can include or be derived from a phenolic resin (e.g., PF), MDI, MUF, UF, latex, epoxy, polyester, like materials, or any combination thereof. The resin-impregnated paper may be referred to herein as "phenolic paper," regardless of the type of resin used. The top surface layer 58 and the bottom surface layer 60 can be bonded to the top layer 54 and the bottom layer 56, respectively, using an adhesive, such as melamine glue. In some examples, the resin in the phenolic paper can be the same as the binding agent or resin used in the core layer 52, the top layer 54, and/or the bottom layer 56. Using the same resin may help promote adhesion between or among the layers. In certain implementations, the resin can a liquid that is saturated into paper during a phenolic paper manufacturing process. The resin can be cured (e.g., polymerized) by heat and/or pressure during the composite manufacturing process described herein. In various implementations, a "surface layer" (e.g., of resin-impregnated paper) can be covered with paint, coatings, or other materials and does not need to be positioned at an outermost surface of the composites described herein.

In other examples, the composite material 50 may not include the top layer 54 and/or the bottom layer 56. For example, referring to FIG. 5B, the composite material 50 may include the core layer 52 with the top surface layer 58 and/or the bottom surface layer 60 disposed above and below the core layer 52 (e.g., a single layer with binding agent and polymeric fibers and/or polymeric film particles), respectively. Additionally or alternatively, the composite material 50 may include only one of the top surface layer 58 and the bottom surface layer 60.

Table E lists various parameters relating to the composition and structure of the core layer 52, the top layer 54, the bottom layer 56, the top surface layer 58, and the bottom surface layer 60. The table includes low, typical, and high values for each parameter. Various embodiments include any parameter value (e.g., any integer or real number) within the cited ranges. For example, the polymeric fiber weight percentage (wt %) in the core layer 52 can be 0, 1, 2, . . . , 97, or 98. Express support and written description of these parameter values for each parameter are hereby represented.

TABLE E

Parameter values for each layer in the composite material.

| Layer Composition | Low | Typical | High |
|---|---|---|---|
| Core Layer | | | |
| Polymeric Fiber (wt %) | 0 | 45 | 98 |
| Average/Median Length of Polymeric Fibers (mm) | 2 | 30 | 50 |
| Total Filler (wt %) | 0 | 45 | 98 |
| Natural Fiber Filler (wt %) | 0 | 0 | 75 |
| Polymeric Filler (e.g., BOPP) (wt %) | 0 | 45 | 98 |
| Inorganic Filler (wt %) | 0 | 0 | 50 |
| Fiberglass Filler (wt %) | 0 | 0 | 75 |
| Total Additives (wt %) | 0 | 4 | 25 |
| Total Binding Agent (e.g., MDI + water) (wt %) | 2 | 6 | 10 |

TABLE E-continued

Parameter values for each layer in the composite material.

| Layer Composition | Low | Typical | High |
|---|---|---|---|
| Top and Bottom Layers | | | |
| Polymeric Fiber (wt. %) | 0 | 45 | 98 |
| Average/Median Length of Polymeric Fibers (mm) | 1 | 13 | 25 |
| Total Filler (wt %) | 0 | 45 | 98 |
| Natural Fiber Filler (wt %) | 0 | 0 | 75 |
| Polymeric Filler (e.g., BOPP) (wt %) | 0 | 45 | 98 |
| Inorganic Filler (wt %) | 0 | 0 | 50 |
| Fiberglass Filler (wt %) | 0 | 0 | 75 |
| Total Additives (wt %) | 0 | 4 | 25 |
| Total Binding Agent (wt %) | 2 | 6 | 10 |
| Top and Bottom Surface Layers | | | |
| Paper Weight (without Resin) (lb) | 90 | 215 | 280 |
| Thickness of Single Paper Sheet (mm) | 0.13 | 0.30 | 0.46 |
| Number of Paper Sheets per Layer | 1 | 1 | 3 |
| Resin Content (wt %) | 20 | 35 | 45 |

As indicated in Table E, the polymeric fibers in the core layer 52 can be longer than the fibers in the top layer 54 and/or the bottom layer 56. In general, longer fibers in the core layer 52 can result in improved performance characteristics for the composite material 50, as described herein. For example, a composite having longer fibers can be stiffer than a composite having only shorter fibers, possibly due to greater entanglements among neighboring fibers. In such instances, it can be desirable to use relatively thick core layers with longer fibers, to achieve a higher overall amount or concentration of longer fibers in the composite material 50.

It is presently discovered, however, that longer fibers can be more difficult to form into uniform layers during the manufacturing processes described herein. For example, longer fibers can result in a core layer that is unevenly distributed within the composite material 50 and/or that has an irregular or nonuniform thickness or rough surface with large peaks and valleys. The longer fibers tend to form clumps or masses of fibers, possibly due to the greater fiber entanglements, when attempting to spread the fibers into a mat or sheet. By contrast, shorter fibers are generally easier to form into uniform layers.

Figure 6:
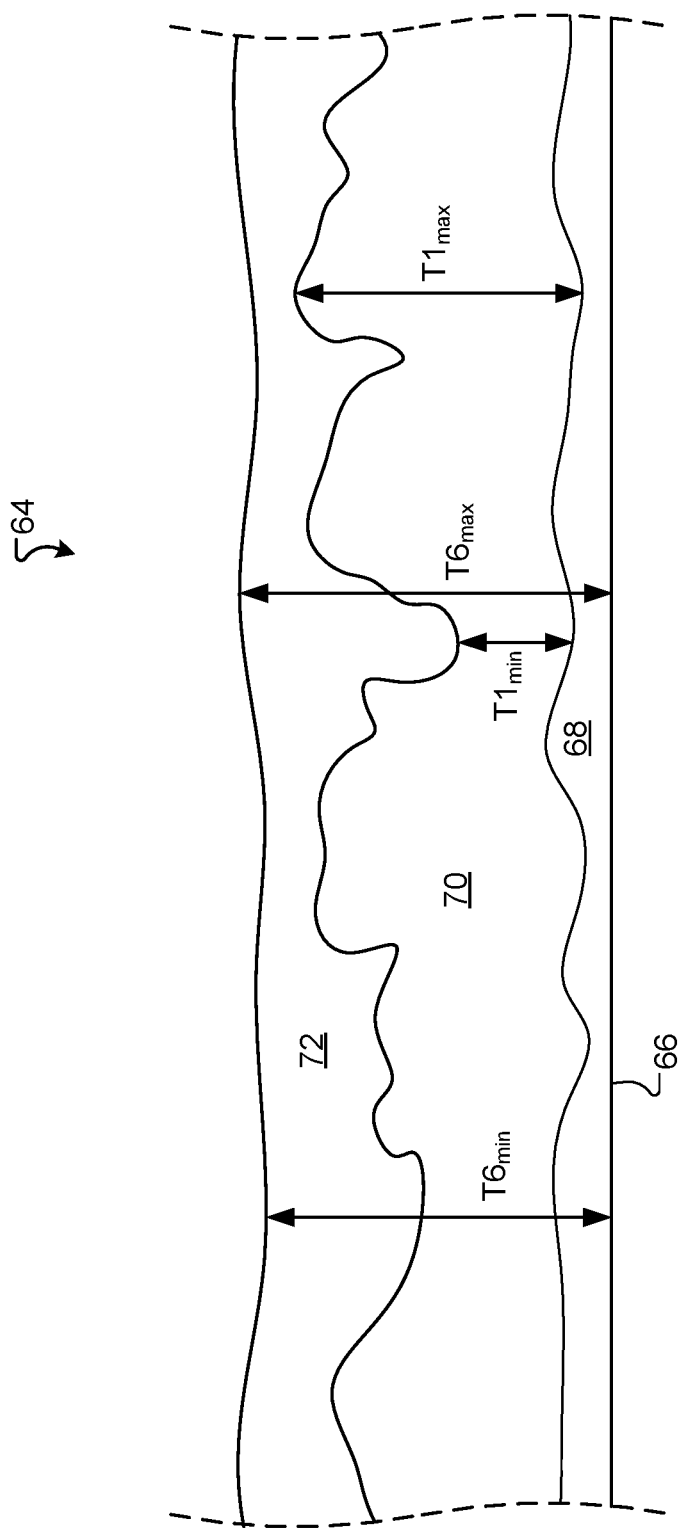
FIG. 6 is a schematic, side view of three layers having polymeric fibers, in accordance with certain embodiments.

For example, FIG. 6 illustrates an example in which three layers 64 of fiber mixtures have been spread onto a flat substrate 66. A bottom layer 68 includes short polymeric fibers and a binding agent, a core layer 70 includes long polymeric fibers and binding agent, and a top layer 72 includes short polymeric fibers and a binding agent. As depicted, the short fibers in the bottom and top layers 68, 72 are able to form relatively uniform layers and/or fill in any peaks or valleys in the core layer 70, which can be irregular or nonuniform due to the long fibers. For example, the bottom layer 68 can be initially formed as a layer having a substantially uniform thickness on the flat substrate 66. When the core layer 70 is applied to the bottom layer 68, however, the long fibers in the core layer 70 can form clumps or balls of fiber that can disrupt the bottom layer 68 and/or result in a core layer that is substantially nonuniform in thickness. For example, as depicted in FIG. 6, the core layer 70 can have a minimum thickness $T1_{min}$ and a maximum thickness $T1_{max}$, and a ratio of $T1_{min}$ to $T1_{max}$ can be less than or equal to about 0.1, 0.25, 0.5, or 0.75. Finally, the top layer 72 can be spread onto the core layer 70 and can be used to cover any peaks or valleys (or other bumps or recesses) in the core layer 70. A combined thickness of all three layers 64 can be substantially uniform. For example, the three layers 64 can have a minimum thickness $T6_{min}$ and a maximum thickness $T6_{max}$, and a ratio of $T6_{min}$ to $T6_{max}$ can be greater than or equal to about 0.7, 0.8, 0.9, or 0.95.

Figure 7:
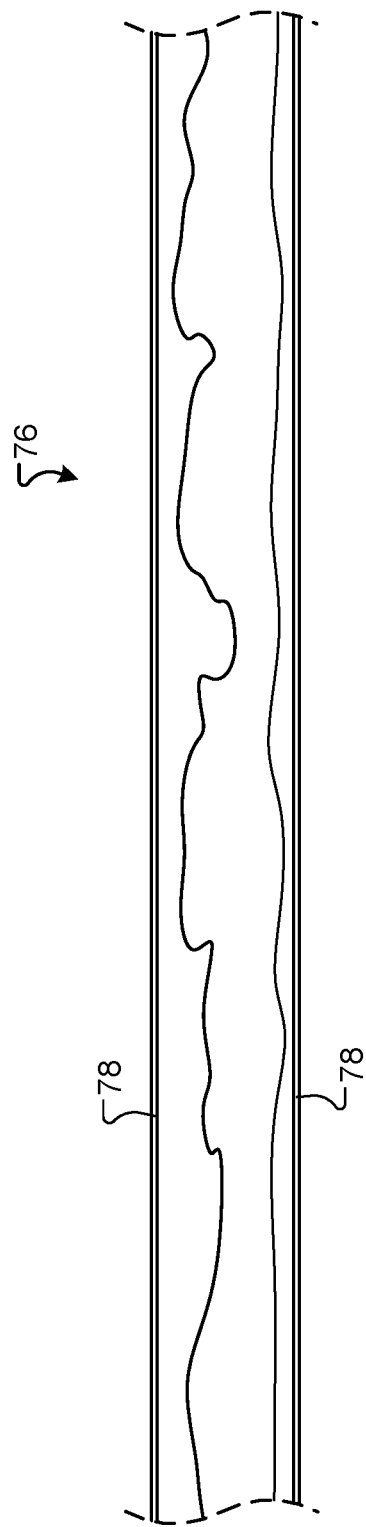
FIG. 7 is a schematic, side view of a composite material having three layers of polymeric fibers and top and bottom surface layers of a resin-impregnated paper, in accordance with certain embodiments.

FIG. 7 illustrates an example in which the three layers from FIG. 6 have been pressed and heated to form a composite material 76 having top and bottom surface layers of resin-impregnated paper 78 (e.g., phenolic paper). The thickness variations described above with respect to FIG. 6 can also be present in the composite material 76. For example, the core layer 70 can be substantially irregular or nonuniform in thickness, and the composite material 76 itself (or a combination of the bottom layer 68, the core layer 70, and the top layer 72) can be substantially uniform in thickness.

Referring again to FIG. 5B, in other examples, the composite materials described herein may include the core layer 52 and at least one surface layer of resin-impregnated paper (e.g., the top surface layer 58 and/or the bottom surface layer 60), but may not include top and bottom layers of polymeric fiber (e.g., the top layer 54 and/or the bottom layer 56). In such instances, a substantially uniform (e.g., less than 20%, 10%, or 5% thickness variation) core layer can be obtained by using shorter polymeric fibers (e.g., 13 mm average length) than may be used when the top and bottom layers of polymeric fiber are included. Additionally or alternatively, a substantially uniform core layer can be obtained by using a mixture of shorter polymeric fibers and longer polymeric fibers. The mixture can include, for example, a distribution of polymeric fibers having a variety of lengths that include the longer polymeric fibers and the shorter polymeric fibers (e.g., a substantially uniform distribution of fiber lengths). Such variations in polymeric fiber lengths can be achieved in some instances by shredding and/or granulating polymeric fibers, as described herein. Additionally or alternatively, in some examples, the mixture of polymeric fibers can include a bimodal distribution of polymeric fiber lengths. A histogram for the bimodal distribution can include, for example, a first peak corresponding to a shorter polymeric fiber length and a second peak corresponding to a longer polymeric fiber length, such that the bimodal distribution includes a relatively high concentration of shorter fibers, a relatively high concentration of longer fibers, and a relatively low concentration of medium-length fibers (e.g., having lengths between the shorter fibers and the longer fibers). The bimodal distribution can be achieved by mixing a supply of longer fibers with a supply of shorter fibers. In general, the longer polymeric fibers can result in composite materials having higher stiffness or strength, and the shorter polymeric fibers can be used to achieve smoother exterior surfaces and/or more uniform thicknesses for the core layer 52. For example, the shorter fibers can fill in voids, interstitial spaces, or valleys formed by the longer fibers. In some examples, the longer polymeric fibers can have an average length greater than about 8 mm, greater than about 30 mm, or from about 8 mm to about 50 mm. The shorter polymeric fibers can have an average length less than about 25 mm, less than about 13 mm, or from about 1 mm to about 25 mm. The single core layer 52 can be formed using, for example, rotating brushes, pick rollers, air laying, and/or similar devices, which can adjust or rearrange a mat of fibers to make the mat more uniform or smooth, prior to heating or compression. Such techniques can avoid or reduce the need for using the top and/or bottom layers of polymeric fiber to achieve polymeric fiber mats that are substantially uniform in thickness.

Figure 8:
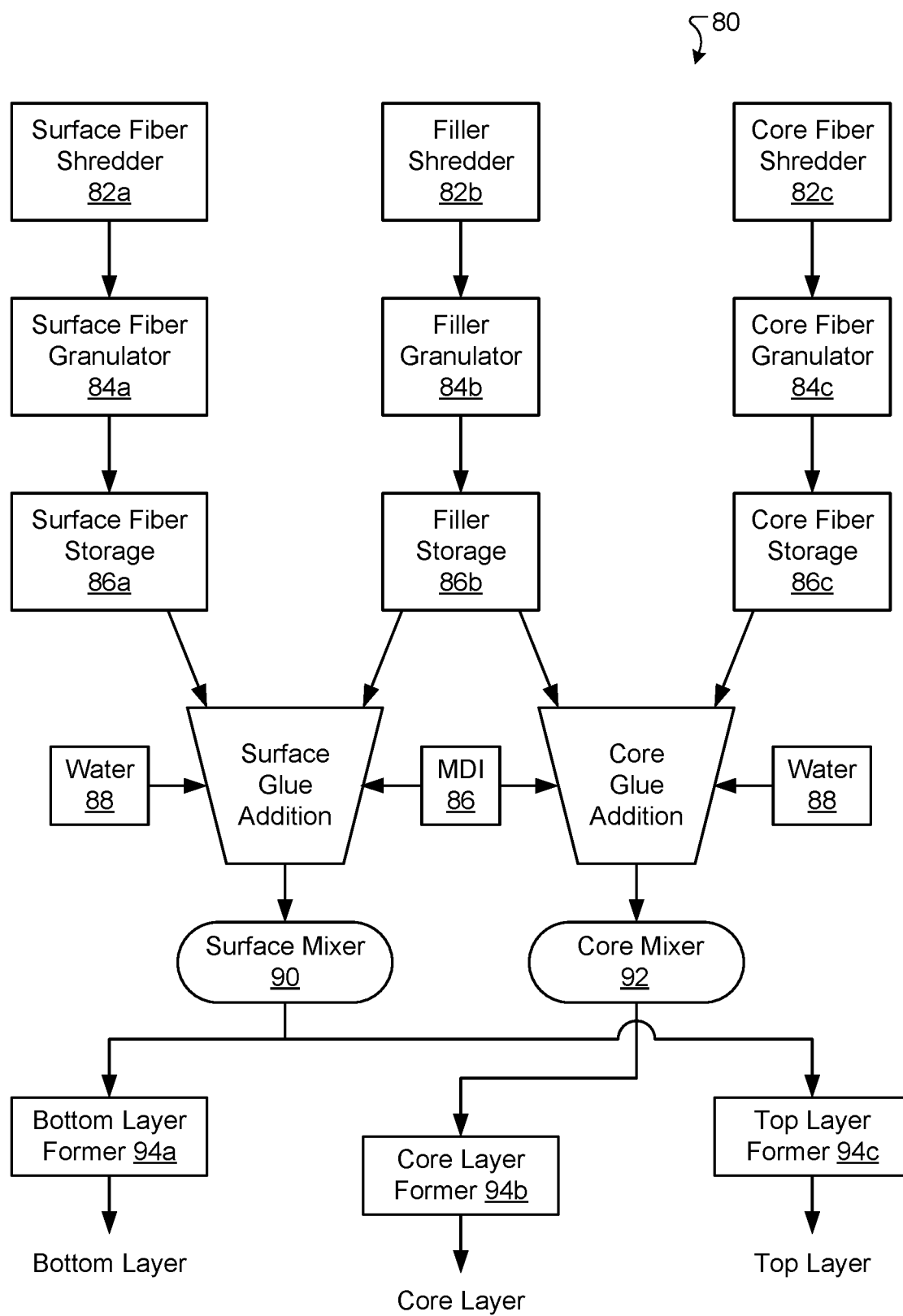
FIG. 8 is a schematic diagram of a manufacturing process for a composite material, in accordance with certain embodiments.
Figure 9:
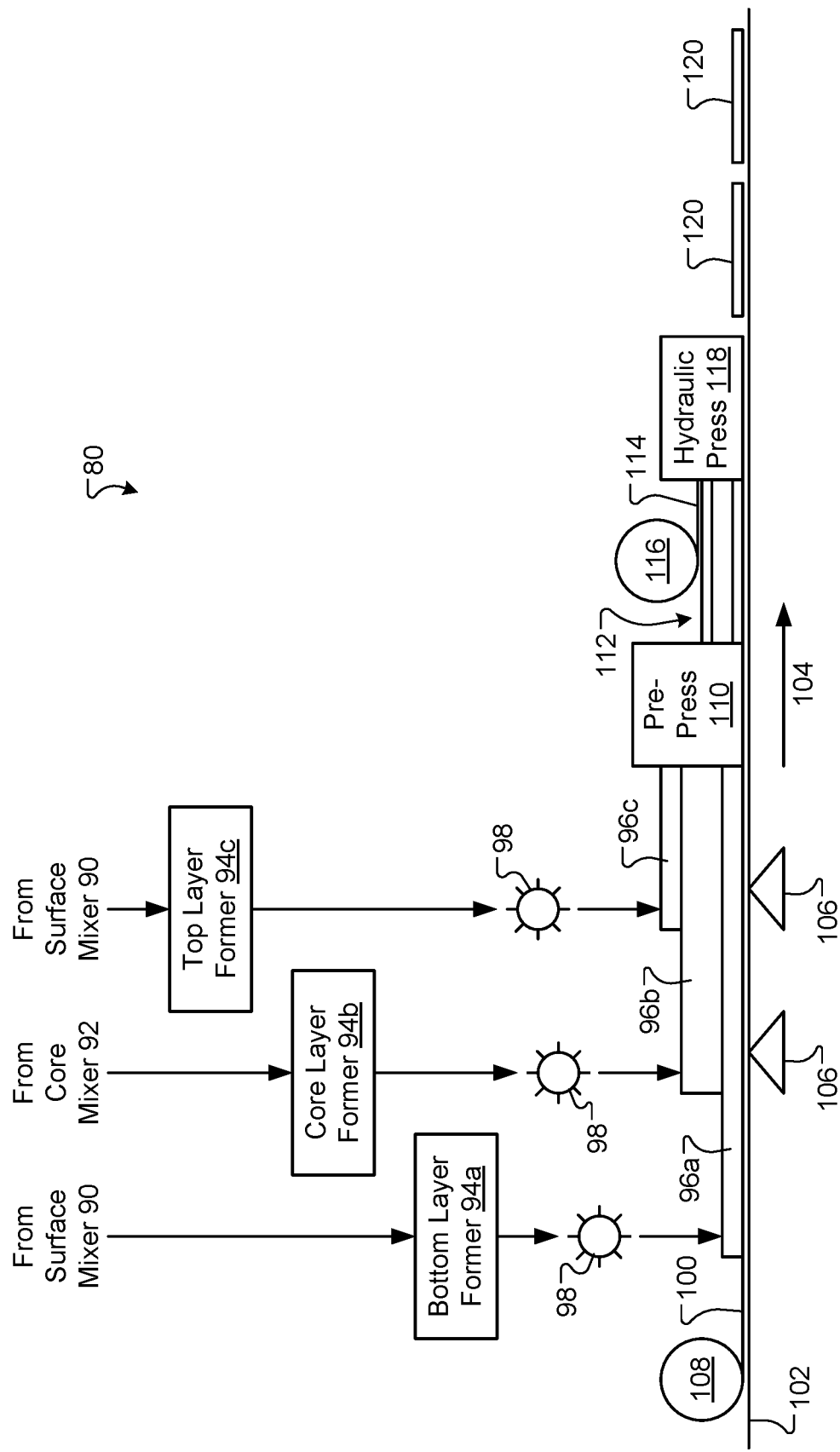
FIG. 9 is a schematic diagram of a manufacturing process for a composite material, in accordance with certain embodiments.

FIGS. 8 and 9 include schematic diagrams of a manufacturing process 80 for producing a composite material in accordance with certain embodiments. Referring to FIG. 8, materials containing carpet fiber and/or other polymeric fiber can be added to a surface fiber shredder 82a and a core fiber shredder 82c, which can generate shredded fiber materials. The surface fiber shredder 82a and the core fiber shredder 82c can provide the shredded fiber materials to a surface fiber granulator 84a and a core fiber granulator 84c, respectively, which can generate granulated fiber materials. The granulated fiber materials can be or include, for example, individual polymeric fibers that have been reduced in size or length, separated from one another, and/or not bonded together (e.g., with adhesive). The surface fiber granulator 84a and the core fiber granulator 84c can deliver the granulated fiber materials to a surface fiber storage 86a and a core fiber storage 86c.

In parallel, polymeric filler materials, such as BOPP (or other single or multilayer films, as described herein), and/or MRF residuals, can be provided to a filler shredder 82b, which can deliver shredded polymeric fillers to a filler granulator 84b, which can deliver granulated polymeric fillers to a filler storage 86b. The granulated polymeric fillers can include particles or chips of BOPP films (e.g., films of BOPP that have been reduced in size or converted to small pieces), other polymeric films (e.g., films that include or are formed from polymers or materials other than BOPP), packaging films, barrier packaging films, MRF residuals, or other suitable polymeric filler materials. Average or median particle sizes for the granulated polymeric filler materials can be, for example, from about 0.5 mm to about 10 mm, or about 5 mm in diameter, length, or width. An average or median thickness of the BOPP particles or other polymeric filler particles can be from about 8 microns to about 75 microns. In some implementations, the filler shredder 82b, the filler granulator 84b, and/or the filler storage 86b can be used to process and/or store other types of fillers, besides polymeric filler materials, such as natural fiber fillers, inorganic fillers (e.g., mineral fillers), and/or fiberglass fillers, as described herein.

In general, the surface fiber granulator 84a, the core fiber granulator 84c, and/or the filler granulator 84b can granulate materials through fixed diameter screens, which can result in a range of fiber lengths and particle sizes, which can be normally distributed. For example, a screen size for the surface fiber granulator 84a can be about 4 mm, about 8 mm, or about 16 mm. A screen size for the core fiber granulator 84c can be about 6 mm, about 13 mm, about 25 mm, about 38 mm, or about 50 mm. A screen size for the filler granulator 84b can be about 3 mm, about 6 mm, or about 12 mm.

Next, binding agent components, such as MDI 86 and water 88 (and optionally a polyol and/or auxiliary materials for creating a polyurethane foam), can be added to the granulated fiber materials and the granulated polymeric filler. The granulated fiber materials from the surface fiber storage 86a and the granulated filler from the filler storage 86b can be mixed with MDI 86 and water 88 in a surface mixer 90. Likewise, the granulated fiber materials from the core fiber storage 86c and the granulated filler from the filler storage 86b can be mixed with MDI 86 and water 88 in a core mixer 92. A ratio of water to MDI can be, for example, from about 1:4 to about 1:1, or about 1:2, by weight. In general, it can be desirable to use enough water so that a reaction between MDI and water can proceed to completion (e.g., to form polyurea). Insufficient amounts of water may result in unreacted MDI adhering to and/or contaminating process equipment, such as a cycle press or a continuous roll press. A mold release can be sprayed onto the process equipment to avoid or reduce this issue; however, if enough water is utilized, there may be no need to use the mold release. Once formed, the mixtures can be delivered to a bottom layer former 94a, a core layer former 94b, and a top layer former 94c, as shown.

Referring to FIG. 9, the bottom layer former 94a, the core layer former 94b, and the top layer former 94c can be used to generate a bottom layer 96a, a core layer 96b, and a top layer 96c, respectively, from the respective mixtures of fiber, filler, MDI, and water. One or more dissolving rollers 98 can be used to form these layers. Alternatively or additionally, the bottom layer former 94a, the core layer former 94b, the top layer former 94c, and/or the dissolving rollers 98 can utilize or include rotating brushes, pick rollers, air laying, and/or similar devices. In the depicted example, the bottom layer 96a, the core layer 96b, and the top layer 96c are formed on a bottom sheet 100 or web of phenolic paper traveling on a conveyor 102 in a process direction 104, preferably at a constant or near constant speed. One or more scales 106 can be used to measure a weight of the bottom layer 96a, the core layer 96b, and/or the top layer 96c. The bottom sheet 100 of phenolic paper can be obtained from a roll 108 or other source.

In certain examples, when the binding agent includes a polyurethane (e.g., a polyurethane foam), the bottom layer 96a, the core layer 96b, and the top layer 96c can include polyurethane precursors, such as a polyol, MDI (or other isocyanate), water, and/or auxiliary materials (e.g., catalysts, foaming agents, and/or stabilizers). The polyurethane precursors can be combined with other ingredients in the surface mixer 90 and/or the core mixer 92, such that the bottom layer 96a, the core layer 96b, and/or the top layer 96c include the polyurethane precursors when initially formed (e.g., by the bottom layer former 94a, the core layer former 94b, and/or the top layer former 94c). Alternatively or additionally, one or more of the polyurethane precursors (e.g., the polyol) can be added or applied to the bottom layer 96a, the core layer 96b, and/or the top layer 96c after the bottom layer 96a, the core layer 96b, and/or the top layer 96c have been formed. For example, one or more of the polyurethane precursors can be sprayed or coated onto the bottom layer 96a, the core layer 96b, and/or the top layer 96c. A location in the manufacturing process 80 at which the polyurethane precursors are combined with one another and/or mixed with other materials can depend on polyurethane precursor stability. It can be desirable to choose polyurethane precursors that are relatively stable, so that the polyurethane precursors provide an adequate working time and/or do not react too quickly to form the polyurethane. For example, it can be desirable in some instances for the polyurethane reaction to be triggered by the application of heat (e.g., in a hydraulic press), as described herein.

Once formed, the bottom layer 96a, the core layer 96b, and the top layer 96c can be delivered along the conveyor 102 to a pre-press 110, which can apply heat and/or pressure to form a compressed mat 112 of the bottom sheet 100 and the three layers 96a, 96b, and 96c. The compressed mat 112 can have a substantially smooth top surface. A top sheet 114 of phenolic paper can then be obtained from a roll 116 and applied (e.g., using adhesive) to the compressed mat 112, and the compressed mat 112 and the top sheet 114 can be conveyed to a hydraulic press 118, which can be a cycle press or a continuous roll press, as described herein. The hydraulic press 118 can apply additional heat and pressure to convert the compressed mat 112 with the top sheet 114 into panels or sheets of a composite material 120. The heat and pressure in the hydraulic press 118 can further compress the bottom layer 96a, the core layer 96b, and the top layer 96c until a desired final thickness is reached. The heat and pressure can cure the MDI (or other binding agent) and/or can cure the resin in the phenolic paper.

In some instances, when the binding agent includes polyurethane precursors, the heat and pressure in the hydraulic press 118 can trigger a reaction between one or more polyurethane precursors to form a polyurethane. The polyurethane can include a polyurethane foam that expands to fill an entire space between platens in the hydraulic press 118. For example, the polyurethane foam can expand to fill any voids or interstitial spaces between polymeric fibers and/or filler materials in the bottom layer 96a, the core layer 96b, and/or the top layer 96c. Additionally or alternatively, use of polyurethane foam as a binding agent can require less compression or pressing of polymeric fiber and/or filler materials. For example, a separation distance between the platens can be set to a predetermined value, and the polyurethane foam can expand to fill a gap or space between the platens. The polyurethane foam can act as a matrix that carries or holds the polymeric fibers and/or fillers, which can be distributed throughout the polyurethane foam.

Advantageously, when a polyurethane foam is formed and/or used in the composite materials described herein, the polyurethane foam can occupy a significant portion (e.g., greater than 25%, greater than 50%, or more) of a total volume of the resulting composite, such that the bottom layer 96a, the core layer 96b, and/or the top layer 96c may not need to include as much polymeric fiber and/or filler materials. For example, compared to embodiments that do not include a polyurethane foam binding agent (e.g., composites that include a polyurea binding agent formed using MDI and water, without a polyol), the resulting composite can have a weight percentage of polymeric fiber and/or filler materials that is lower by 10%, 20%, 30%, 40%, 50%, or more. The polyurethane foam can result in composite materials are not as heavy as non-foamed composites (e.g., lighter or lower in density by 10%, 20%, 30%, 40%, 50%, or more). Additionally or alternatively, the polyurethane foam can be more water resistant than other binding agents described herein. In some instances, for example, the closed cells of the polyurethane foam can prevent water from infiltrating into the composite materials described herein. Further, composite materials produced using a rigid polyurethane foam can be stronger or stiffer than other composite materials described herein. The added strength or stiffness can be due to the polyurethane foam connecting polymeric fibers and/or fillers in a single matrix.

In other examples, rather than passing the phenolic paper (or other resin-impregnated paper) through the pre-press 110 and/or the hydraulic press 118, the phenolic paper can be applied after the bottom layer 96a, the core layer 96b, and the top layer 96c have been heated and pressed by the pre-press 110 and/or the hydraulic press 118 to form a composite. The phenolic paper can be bonded to the resulting composite (e.g., using a glue) and the resin in the phenolic paper can be cured (e.g., by applying heat).

Figure 5B:
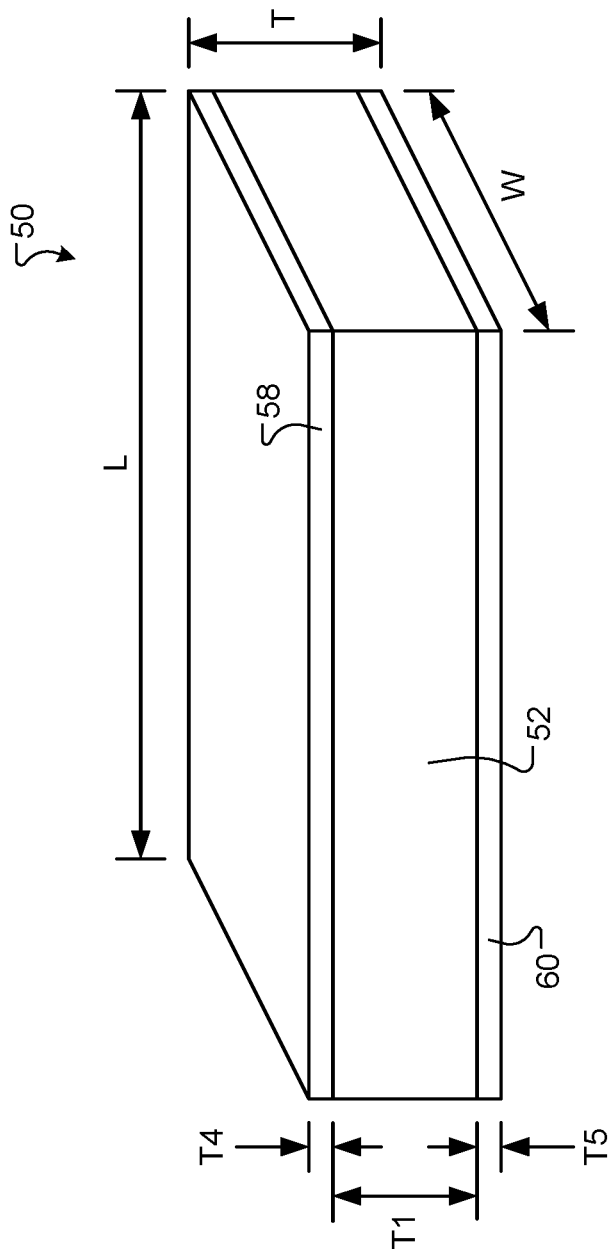
FIG. 5B is a schematic, perspective view of a composite having a single layer of carpet fiber, binding agent, and optional fillers, in accordance with certain embodiments.

Additionally or alternatively, the composite materials described herein can be formed using a single layer of binding agent, polymeric fibers, polymeric films, and/or other fillers or additives, as described herein and shown in FIG. 5B. For example, the manufacturing process 80 can be modified to form or include the core layer 96b but not the bottom layer 96a and the top layer 96c.

After the sheets of composite material have been formed, the sheets can be cooled and cut to desired shapes and sizes, and various finishing processes can be utilized to form a finished product. For example, edges or other portions of the composite sheet can be subjected to thermal or heat treatments in which an open flame, infrared radiation, or a hot roller melts polymeric material and/or closes any open structures or pores of the composition, thereby reducing or eliminating pathways for moisture absorption. Additionally or alternatively, the composite material can be coated with one or more coatings, such as water-based paint (e.g., latex paint or acrylic paint), solvent based paint, two-part catalyst paint, nano-based coatings, and/or UV cured coatings. Additionally or alternatively, one or more sealants (e.g., silicone-based sealant materials) and/or laminate or film banding can be applied. In some examples, the finishing processes can include surface treatments, such as embossing (inside or after the hydraulic press 118), molding, and/or digital printing (e.g., performed on the phenolic paper before or after the hydraulic press 118). Embossing can be performed using one or more engraved plates or belts in the hydraulic press 118. The engraved plates can emboss a realistic wood pattern into a top or bottom layer of phenolic paper. Alternatively or additionally, embossing can be performed after the hydraulic press, for example, in a finishing process using a flat press and/or a roll embosser. The digital printing can be performed, for example, to add a printed texture resembling natural wood, stone, tile, brick, or other building material. One or more coatings can be applied (e.g., to the phenolic paper), such as a powder coating or a clear coat. In some implementations, a masonry finish can be obtained or simulated by gluing or affixing aggregate materials, stucco, and/or cementitious materials or products to an exterior surface of the composite materials described herein. Alternatively or additionally, metal materials (e.g., aluminum sheets) can be attached to the composite materials to obtain a metal surface layer.

In various implementations, the finishing processes can include one or more of the following steps, in any combination. The cooled panels from the hydraulic press can be ripped or cut into boards of various widths, for example, using a multi-gang rip saw. The boards can be transferred automatically to a linear finishing line, which can align the boards from side-to-side and/or end-to-end. The boards can then be processed using various finishing steps, which can depend on the specific product being manufactured. These finishing steps can include, for example, deburring (sanding), thermal treatment (e.g., flame treatment tunnel or hot roller), edge banding or other edge application, and/or molding (e.g., in a shaper). Once the finishing steps are complete, the composite product can go through a laser QA system, for example, to confirm dimensions (e.g., width and thickness) and/or detect any surface imperfections. Boards can be rejected automatically based on the QA system.

In some examples, the resulting boards can go through as many as three cycles of painting and drying. Two coats of primer or sealer can be applied to edges or an entire board, with each coat preferably being dried in an infrared thermal oven. A final coating of top paint can then be applied and dried. A cooling step can be used to remove heat from the product prior to automatic packaging, to prevent sticking of boards. Protective coatings or packing materials can be applied prior to shipment. Boards can be sub-bundled, if desired, and/or automatically palletized, and pallets can be wrapped and labeled.

Figure 10:
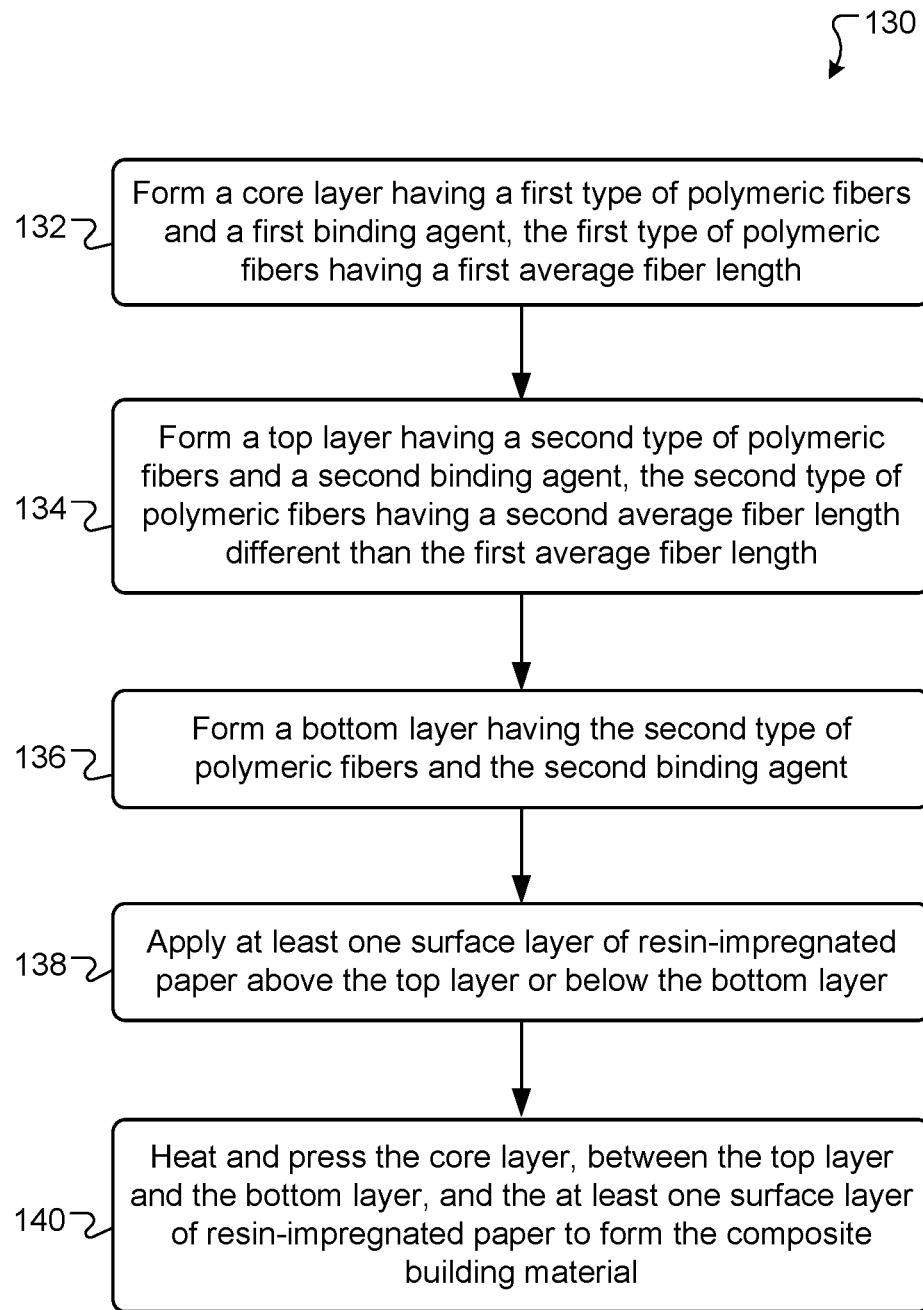
FIG. 10 is a flowchart of a method of manufacturing a composite building material, in accordance with certain embodiments.

FIG. 10 is a flowchart of an example method 130 of manufacturing a composite building material. A core layer having a first type of polymeric fibers (e.g., carpet fibers) and a first binding agent is formed (step 132). The first type of polymeric fibers has a first average fiber length. A top layer having a second type of polymeric fibers (e.g., carpet fibers) and a second binding agent is formed (step 134). The second type of polymeric fibers has a second average fiber length different than the first average fiber length. A bottom layer having the second type of polymeric fibers and the second binding agent is formed (step 136). At least one surface layer of resin-impregnated paper is applied step 138) above the top layer or below the bottom layer. The composite building material is formed by heating and pressing (step 140) the core layer and the at least one surface layer of resin-impregnated paper, with the core layer positioned between the top layer and the bottom layer. In some examples, step 136 is performed before step 132, which is performed before step 134. In certain implementations, the first type of polymeric fibers and the second type of polymeric fibers can include fibers having the same or similar chemical composition and/or fiber diameters.

Figure 11:
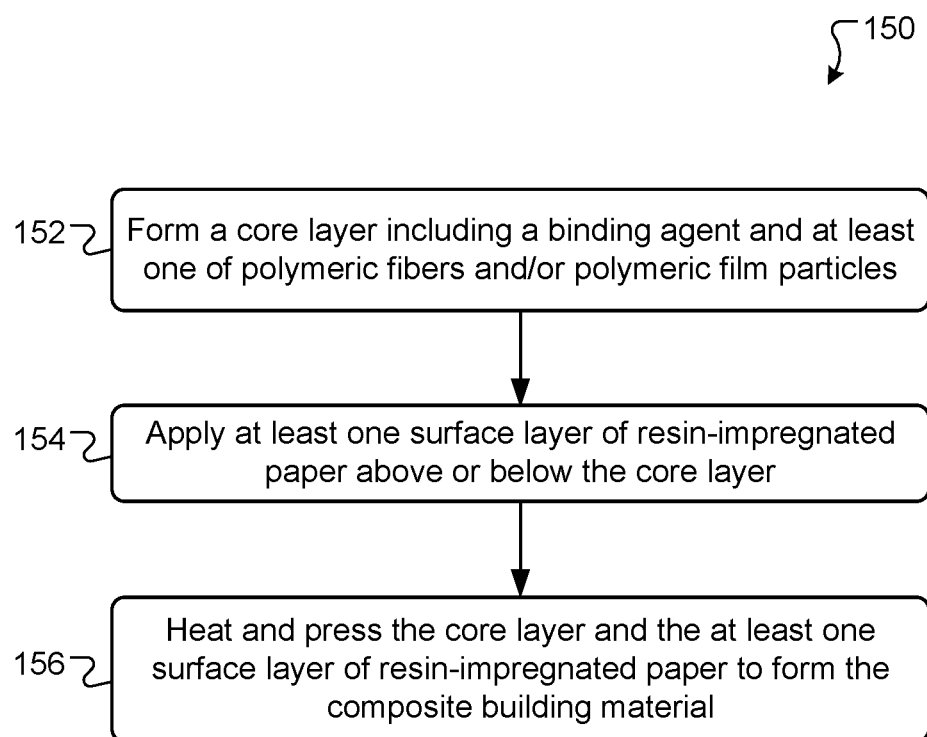
FIG. 11 is a flowchart of a method of manufacturing a composite building material, in accordance with certain embodiments.

FIG. 11 is a flowchart of an example method 150 of manufacturing a composite building material. A core layer is formed (step 152) that includes a binding agent at least one of polymeric fibers or polymeric film particles (e.g., polymeric fibers, polymeric film particles, or both polymeric fibers and polymeric film particles). At least one surface layer of resin-impregnated paper is applied (step 154) above or below the core layer. The core layer and the at least one surface layer of resin-impregnated paper are heated and pressed (step 156) to form the composite building material.

In certain examples, a variety of polymeric fiber lengths can be used to achieve composite building materials having a variety of performance characteristics. In general, longer polymeric fibers (e.g., 25 mm or longer) can be used to produce boards that are stiffer or higher in strength. Additionally or alternatively, shorter polymeric fibers (e.g., less than 25 mm) can be used to produce boards that have smoother exterior surfaces and/or may be easier to mold and/or shape in a finishing process. For example, the shorter polymeric fibers (and/or higher fiber densities) can be used to produce boards that are easier to mold and/or shape (e.g., using a router, shaper, etc.). The shorter fibers can be used to achieve smoother exterior surfaces, as described herein.

EXAMPLES

A variety of composite materials having carpet fiber and optionally a top and/or bottom surface layer of phenolic paper were produced in accordance with the composites and methods described herein. Table F lists various parameters related to the composition and structure of two examples of these composite materials that were used for performance testing. Samples of the composite materials were produced using a two daylight, hydraulic press from DIEFFENBACHER, with cycle times of approximately 10 minutes. Platen temps in the press for Example A were approximately 410-420° F. (210-216° C.) and for Example B were approximately 390° F. (199° C.). The phenolic paper for the top and bottom surface layers was obtained from PANELTECH (of Hoquiam, Wash.).

TABLE F

Parameter values for example composite materials.

| Composition | Example A | Example B |
|---|---|---|
| Core Layer | | |
| Carpet Fiber (wt %) | 94 | 70 |
| Carpet Fiber Average Length (mm) | 7 | 10 |
| Binding Agent (MDI + water) (wt %) | 6 | 7 |
| Natural Fiber Filler (wt %) | 0 | 0 |
| Polymeric Filler (BOPP) (wt %) | 0 | 23 |
| Inorganic Filler (wt %) | 0 | 0 |
| Fiberglass (wt %) | 0 | 0 |
| Additives (wt %) | 0 | 0 |
| Average Thickness (% of Combined Thickness of Core Layer, Top Layer, and Bottom Layer) | 70 | 60 |
| Average Thickness (mm) | 13.3 | 11.4 |
| Top and Bottom Layers | | |
| Carpet Fiber (wt. %) | 91 | 93 |
| Carpet Fiber Average Length (mm) | 2 | 6 |
| Binding Agent (MDI + water) (wt %) | 9 | 7 |
| Natural Fiber Filler (wt %) | 0 | 0 |
| Polymeric Filler (BOPP) (wt %) | 0 | 0 |
| Inorganic Filler (wt %) | 0 | 0 |
| Fiberglass (wt %) | 0 | 0 |
| Additives (wt %) | 0 | 0 |
| Top Layer Average Thickness (% of Combined Thickness of Core Layer, Top Layer, and Bottom Layer) | 15 | 20 |
| Top Layer Average Thickness (mm) | 2.85 | 3.8 |
| Bottom Layer Average Thickness (% of Combined Thickness of Core Layer, Top Layer, and Bottom Layer) | 15 | 20 |
| Bottom Layer Average Thickness (mm) | 2.85 | 3.8 |
| Top and Bottom Surface Layers | | |
| Paper Weight (without Resin) (gsm) | N/A | 200 |
| Number of Paper Sheets per Layer | 0 | 1 |
| Resin Content (wt %) | N/A | 35 |

Table G illustrates results from performance tests that were performed on the example composite materials listed in Table F. The results indicate that the coefficient of thermal expansion (CTE; as measured using ASTM D6341-16) for Example A was 0.00003 to 0.00006 m/m° C., and the CTE for Example B was 0.000006 to 0.000008 m/m° C. The results also indicate that linear expansion of a 6.1 m (20 ft) board due to a 50° C. temperature change (from −10° C. to 40° C.) was 1.7 to 3.3 cm for Example A and 0.33 to 0.43 cm for Example B. The significant reduction in CTE and linear thermal expansion (e.g., as much as a factor of 10) achieved with Example B (and with other similar samples in other experiments) is believed to be primarily due to the use of phenolic paper, rather than any other differences between the samples). As Table F indicates, Example B included phenolic paper on the top and bottom surfaces while Example A did not include any phenolic paper. Advantageously, this reduction in CTE and linear thermal expansion can significantly improve the performance of the composite materials described herein for various building applications, particularly where substantial temperature variations (e.g., of 30° C. or more) may be encountered. Such building applications can include, for example, exterior decking, siding, trim boards, and/or roofing. In some instances, the reduction in CTE achieved through the use of phenolic paper can render the composite materials commercially viable. For example, composite materials that do not utilize phenolic paper on top and/or bottom surfaces may be susceptible to large or excessive amounts of thermal expansion, which can cause installed products to bend, warp, become unfastened or loose, become less visibly attractive, and/or destroy or damage neighboring installed materials.

TABLE G

Performance parameters for the example composite materials.

| Performance Parameter | Example A | Example B |
|---|---|---|
| Coefficient of Thermal Expansion (m/m ° C.) | 3.0E−05 to 6.0E−05 | 6.0E−06 to 8.0E−06 |
| Linear Thermal Expansion of 6.1 m Board due to 50° C. Temperature Change (cm) | 1.7 to 3.3 | 0.33 to 0.43 |
| Linear Expansion of 6.1 m Board due to Submersion in Water for 24 hours (cm) | 1.3 | 0.23 |
| Linear Expansion of 6.1 m Board due to Submersion in Water for 144 hours (cm) | 2.5 | 0.33 |

The results in Table G also indicate that expansion due to moisture absorption was significantly lower for Example B, compared to Example A. For example, linear expansion of a 6.1 m (20 ft) board due to submersion in water at 20° C. for 24 hours was 1.3 cm for Example A and 0.23 cm for Example B. Likewise, linear expansion of a 6.1 m (20 ft) board due to submersion in water at 20° C. for 144 hours was 2.5 cm for Example A and 0.33 cm for Example B. The significant reduction in expansion due to moisture absorption (e.g., as much as a factor of about 8) achieved with Example B (and with similar samples in other experiments) is believed to be primarily due to the use of phenolic paper, rather than any other differences between the samples). Advantageously, this reduction in moisture expansion can significantly improve the performance of the composite materials described herein for various building applications where exposure to moisture may be encountered. Such building applications can include, for example, exterior decking, siding, trim boards, and/or roofing. In some instances, the reduction in CTE achieved through the use of phenolic paper can render the composite materials commercially viable. For example, composite materials that do not utilize phenolic paper on top and/or bottom surfaces may be susceptible to large or excessive amounts of moisture expansion, which can cause installed products to bend, warp, become unfastened or loose, become less visibly attractive, and/or destroy neighboring installed materials.

Additional experiments indicate that use of phenolic paper, as described herein, can significantly improve various performance parameters related to mechanical strength. For example, such experiments indicate that modulus of elasticity, modulus of rupture, and/or yield strength can increase by a factor of 2, 5, 10, or more, due to the use of phenolic paper (e.g., on top and/or bottom surfaces) in the composite materials described herein. Composite materials that do not utilize phenolic paper may have inadequate stiffness or mechanical strength. This can result in product failure or excessive product bending or displacement, and/or may present a safety hazard.

A number of embodiments of the invention have been described. Nevertheless, it will be understood that various modifications may be made without departing from the spirit and scope of the invention. Accordingly, other embodiments are within the scope of the following claims.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention.

The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

Terminology

The phraseology and terminology used herein is for the purpose of description and should not be regarded as limiting.

The term "about", the term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

As used herein, "substantially nonuniform thickness" can refer to one or more layers having a ratio of a minimum thickness to a maximum thickness that is less than 0.5, less than 0.4, less than 0.3, less than 0.2, less than 0.1, or less than 0.05. Likewise, "substantially uniform thickness" can refer to one or more layers having a ratio of a minimum thickness to a maximum thickness that is greater than 0.5, greater than 0.6, greater than 0.7, greater than 0.8, greater than 0.9, or greater than 0.95.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A composite building material, comprising:
    a core layer comprising a first type of polymeric fibers and a first binding agent, the first type of polymeric fibers having a first average fiber length;
    a top layer disposed above the core layer and comprising a second type of polymeric fibers and a second binding agent, the second type of polymeric fibers having a second average fiber length different than the first average fiber length,
        wherein the second average fiber length is less than the first average fiber length;
    a bottom layer disposed below the core layer and comprising the second type of polymeric fibers and the second binding agent,
        wherein an average length of polymeric fibers in the core layer is greater than an average length of polymeric fibers in the top layer and an average length of polymeric fibers in the bottom layer; and
    at least one surface layer of resin-impregnated paper disposed above the top layer or below the bottom layer, wherein the first type of polymeric fibers and the second type of polymeric fibers are compressed, wherein at least one of the first type of polymeric fibers or the second type of polymeric fibers comprises fibers derived from at least one of a scrap fiber source, a used fiber source, a recycled fiber source, or any combination thereof, wherein the first binding agent and the second binding agent are derived from methylenediphenyldiisocyanate (MDI) and comprise at least one of a polyurea or a polyurethane, wherein the core layer comprises a substantially non-uniform thickness, and the core layer, the top layer, and the bottom layer together comprise a substantially uniform thickness, and wherein the core layer, the top layer, the bottom layer, and the at least one surface layer form a rigid board or a rigid sheet.

2. The composite building material of claim 1, wherein at least one of the first type of polymeric fibers or the second type of polymeric fibers comprises fibers derived from at least one of carpet, automotive headliners, automotive sidewalls, automotive fabrics, insulation materials, or any combination thereof.

3. The composite building material of claim 1, wherein the first average fiber length is greater than about 25 mm.

4. The composite building material of claim 1, wherein the substantially nonuniform thickness comprises an irregular thickness with peaks and valleys, wherein the substantially nonuniform thickness comprises a minimum thickness and a maximum thickness, and wherein the minimum thickness is less than half of the maximum thickness.

5. The composite building material of claim 1, wherein the substantially uniform thickness comprises a minimum thickness and a maximum thickness, and wherein the minimum thickness is at least 90% of the maximum thickness.

6. The composite building material of claim 1, wherein at least one of the core layer, the top layer, or the bottom layer comprises a polymeric filler comprising particles formed from at least one of biaxially oriented polypropylene, a polymeric film, a packaging film, a barrier packaging film, a MRF residual, or any combination thereof.

7. The composite building material of claim 1, wherein at least one of the core layer, the top layer, or the bottom layer comprises at least one of an inorganic filler, a natural fiber filler, or fiberglass.

8. The composite building material of claim 1, wherein at least one of (i) the core layer comprises at least one filler or additive that is not present in the top layer or the bottom layer or (ii) at least one of the top layer or the bottom layer comprises at least one filler or additive that is not present in the core layer.

9. The composite building material of claim 1, wherein the at least one surface layer of resin-impregnated paper comprises phenolic paper.

10. A method of manufacturing a composite building material, the method comprising the steps of:

forming a core layer comprising a first type of polymeric fibers and a first binding agent, the first type of polymeric fibers having a first average fiber length;

forming a top layer comprising a second type of polymeric fibers and a second binding agent, the second type of polymeric fibers having a second average fiber length different than the first average fiber length, wherein the second average fiber length is less than the first average fiber length;

forming a bottom layer comprising the second type of polymeric fibers and the second binding agent, wherein an average length of polymeric fibers in the core layer is greater than an average length of polymeric fibers in the top layer and an average length of polymeric fibers in the bottom layer;

applying at least one surface layer of resin-impregnated paper above the top layer or below the bottom layer; and heating and pressing the core layer, between the top layer and the bottom layer, and the at least one surface layer of resin-impregnated paper to form the composite building material, wherein the first type of polymeric fibers and the second type of polymeric fibers are compressed, wherein at least one of the first type of polymeric fibers or the second type of polymeric fibers comprises fibers derived from at least one of a scrap fiber source, a used fiber source, a recycled fiber source, or any combination thereof, wherein the first binding agent and the second binding agent are derived from methylenediphenyldiisocyanate (MDI) and comprise at least one of a polyurea or a polyurethane, wherein the core layer comprises a substantially non-uniform thickness, and the core layer, the top layer, and the bottom layer together comprise a substantially uniform thickness, and wherein the composite building material comprises a rigid board or a rigid sheet.

11. The method of claim 10, wherein at least one of the first type of polymeric fibers or the second type of polymeric fibers comprises fibers derived from at least one of carpet, automotive headliners, automotive sidewalls, automotive fabrics, insulation materials, or any combination thereof.

12. The method of claim 10, wherein forming the core layer comprises mixing the first type of polymeric fibers with the first binding agent, and wherein forming the top layer and the bottom layer comprises mixing the second type of polymeric fibers with the second binding agent.

13. The method of claim 10, wherein applying the at least one surface layer comprises applying a surface layer from the at least one surface layer over the top layer.

14. A composite building material, comprising:

a core layer comprising a first binding agent and a first type of polymeric fibers;

a top layer disposed above the core layer and comprising a second binding agent and a second type of polymeric fibers, wherein an average length of the second type of polymeric fibers is less than an average length of the first type of polymeric fibers, and wherein an average length of polymeric fibers in the core layer is greater than an average length of polymeric fibers in the top layer; and at least one surface layer of resin-impregnated paper disposed above or below the core layer, wherein the first type of polymeric fibers and the second type of polymeric fibers are compressed, wherein at least one of the first type of polymeric fibers or the second type of polymeric fibers comprises fibers derived from at least one of a scrap fiber source, a used fiber source, a recycled fiber source, or any combination thereof, wherein the first binding agent and the second binding agent are derived from methylenediphenyldiisocyanate (MDI) and comprise at least one of a polyurea or a polyurethane, wherein the core layer comprises a substantially non-uniform thickness, and the core layer and the top layer together comprise a substantially uniform thickness, and wherein the core layer, the top layer, and the at least one surface layer form a rigid board or a rigid sheet.

15. The composite building material of claim 14, wherein the first type of polymeric fibers comprises a mixture of long polymeric fibers and short polymeric fibers.

16. The composite building material of claim 15, wherein the mixture of long polymeric fibers and short polymeric fibers comprises a bimodal distribution of fiber lengths.

17. The composite building material of claim 14, wherein at least one of the first type of polymeric fibers or the second type of polymeric fibers comprises fibers derived from at least one of carpet, automotive headliners, automotive sidewalls, automotive fabrics, insulation materials, or any combination thereof.

18. The composite building material of claim 14, wherein the core layer comprises polymeric film particles, and wherein the polymeric film particles comprise at least one of biaxially oriented polypropylene, a packaging film, a barrier packaging film, or any combination thereof.

19. A method of manufacturing a composite building material, the method comprising the steps of:

forming a core layer comprising a first binding agent and a first type of polymeric fibers;

forming a top layer disposed above the core layer and comprising a second binding agent and a second type of polymeric fibers, wherein an average length of the second type of polymeric fibers is less than an average length of the first type of polymeric fibers, and wherein an average length of polymeric fibers in the core layer is greater than an average length of polymeric fibers in the top layer;

applying at least one surface layer of resin-impregnated paper above or below the core layer; and heating and pressing the core layer, the top layer, and the at least one surface layer of resin-impregnated paper to form the composite building material, wherein the first type of polymeric fibers and the second type of polymeric fibers are compressed, wherein at least one of the first type of polymeric fibers or the second type of polymeric fibers comprises fibers derived from at least one of a scrap fiber source, a used fiber source, a recycled fiber source, or any combination thereof, wherein the first binding agent and the second binding agent are derived from methylenediphenyldiisocyanate (MDI) and comprise at least one of a polyurea or a polyurethane, wherein the core layer comprises a substantially non-uniform thickness, and the core layer and the top layer together comprise a substantially uniform thickness, and wherein the composite building material comprises a rigid board or a rigid sheet.

20. The method of claim 19, wherein at least one of the first type of polymeric fibers or the second type of polymeric fibers comprises fibers derived from at least one of carpet, automotive headliners, automotive sidewalls, automotive fabrics, insulation materials, or any combination thereof.

21. The method of claim 19, wherein forming the core layer comprises adding polymeric film particles, and wherein the polymeric film particles comprise at least one of biaxially oriented polypropylene, a packaging film, a barrier packaging film, or any combination thereof.

22. The composite building material of claim 1, wherein the rigid board or the rigid sheet is configured for use in a building product, and wherein the building product comprises at least one of siding, trim, molding, panels, roofing, or decking.

23. The composite building material of claim 1, wherein at least one of the core layer, the top layer, or the bottom layer comprises fiberglass.

24. The composite building material of claim 1, wherein the first type of polymeric fibers comprises fibers that are longer than 25 mm.

25. The composite building material of claim 1, wherein the second average fiber length is less than or equal to half of the first average fiber length.

* * * * *